(12) United States Patent
Muttenthaler et al.

(10) Patent No.: US 12,462,491 B2
(45) Date of Patent: Nov. 4, 2025

(54) ADAPTIVE IMAGE PROCESSING FOR AUGMENTED REALITY DEVICE

(71) Applicant: Snap Inc., Santa Monica, CA (US)

(72) Inventors: Thomas Muttenthaler, Vienna (AT); Kai Zhou, Wiener Neudorf (AT)

(73) Assignee: Snap Inc., Santa Monica, CA (US)

( * ) Notice: Subject to any disclaimer, the term of this patent is extended or adjusted under 35 U.S.C. 154(b) by 309 days.

(21) Appl. No.: 18/118,906

(22) Filed: Mar. 8, 2023

(65) Prior Publication Data

US 2024/0303934 A1    Sep. 12, 2024

(51) Int. Cl.
| | |
|---|---|
| G06T 3/40 | (2024.01) |
| G02B 27/01 | (2006.01) |
| G06T 19/00 | (2011.01) |
| G06V 10/25 | (2022.01) |

(52) U.S. Cl.
CPC ........ *G06T 19/006* (2013.01); *G02B 27/0172* (2013.01); *G06T 3/40* (2013.01); *G06V 10/25* (2022.01); *G02B 2027/0178* (2013.01); *G06V 2201/07* (2022.01)

(58) Field of Classification Search
CPC ............... G06V 10/25; G06V 2201/07; G02B 27/0172; G02B 2027/0178; G06T 3/40; G06T 7/20; G06T 7/70; G06T 15/005; G06T 19/006; G06T 2207/10024; G06T 2207/10028; G06T 2207/10048; G06T 2207/20004; G06T 2207/20084; G06T 2207/20132; G06T 2207/30196; G06T 2207/30244
USPC ................................................. 345/506, 633
See application file for complete search history.

(56) References Cited

U.S. PATENT DOCUMENTS 8,532,435 B1 *  9/2013  Hegde .................. G06T 3/4092
                                                    382/164
2021/0365707 A1   11/2021  Mao et al.

FOREIGN PATENT DOCUMENTS

WO        2024186998         9/2024

OTHER PUBLICATIONS

"International Application Serial No. PCT/US2024/018871, International Search Report mailed Jul. 22, 2024", 3 pgs.
"International Application Serial No. PCT/US2024/018871, Written Opinion mailed Jul. 22, 2024", 5 pgs.

* cited by examiner

*Primary Examiner* — Jacinta M Crawford
(74) *Attorney, Agent, or Firm* — Schwegman Lundberg & Woessner, P.A.

(57) ABSTRACT

Examples describe adaptive image processing for an augmented reality (AR) device. An input image is captured by a camera of the AR device, and a region of interest of the input image is determined. The region of interest is associated with an object that is being tracked using an object tracking system. A crop-and-scale order of an image processing operation directed at the region of interest is determined for the input image. One or more object tracking parameters may be used to determine the crop-and-scale order. The crop-and-scale order is dynamically adjustable between a first order and a second order. An output image is generated from the input image by performing the image processing operation according to the determined crop-and-scale order for the particular input image. The output image can be accessed by the object tracking system to track the object.

20 Claims, 15 Drawing Sheets

ADAPTIVE IMAGE PROCESSING FOR AUGMENTED REALITY DEVICE

TECHNICAL FIELD

The subject matter disclosed herein relates to image processing, particularly in the context of augmented reality (AR) devices.

BACKGROUND

An AR device enables a user to observe a real-world scene while simultaneously seeing virtual content that may be aligned to objects, items, images, or environments in the field of view of the AR device. An AR device can include, or be connected to, an object tracking system that detects or tracks an object captured by one or more optical components (e.g., one or more cameras) of the AR device. For example, the object tracking system may implement a machine learning model that is trained to track an object across a sequence of images, or frames, captured by one or more cameras of the AR device.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
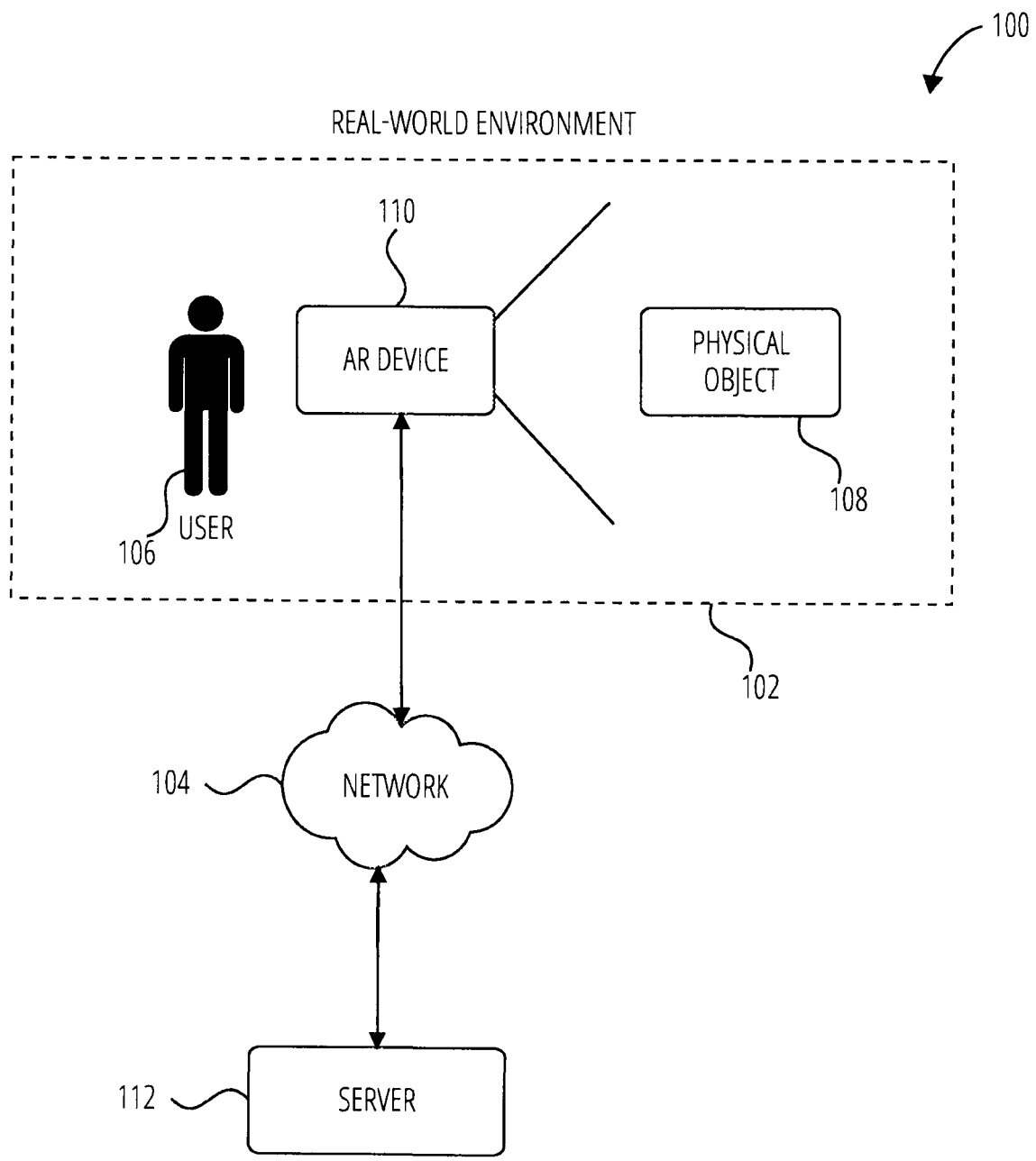
FIG. 1 is a block diagram illustrating a network environment for operating an AR device, according to some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects or environments that reside in the real world are "augmented" or enhanced by computer-generated digital content (also referred to as virtual content or synthetic content). AR can also refer to a system that enables a combination of real and virtual worlds, real-time interaction, and three-dimensional registration of virtual and real objects. A user of an AR system can perceive virtual content that appears to be attached or interact with a real-world physical object. In some examples, an AR device may be a head-wearable AR device, also referred to as a head-mountable AR apparatus. The term "AR application" is used herein to refer to a computer-operated application that enables an AR experience.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment. While examples described in the present disclosure focus primarily on AR devices and AR applications, it will be appreciated that aspects of the present disclosure may be applied to VR devices and VR applications, or to other related devices or applications.

The term "object tracking system" is used herein to refer to a computer-operated application or system that enables a device or system to track visual features identified in images captured by one or more optical sensors, such as one or more cameras. In some examples, the object tracking system builds a model of a real-world environment based on the tracked visual features. An object tracking system may implement one or more object tracking machine learning models to track an object in the field of view of a user during a user session.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMU's gyroscopes can be processed to obtain the pitch, roll, and heading of the IMU and, therefore, of the body with which the IMU is associated. Signals from the IMU's accelerometers also can be processed to obtain velocity and displacement of the IMU.

The term "SLAM" (Simultaneous Localization and Mapping) is used herein to refer to a system used to understand and map a physical environment in real-time. It uses sensors such as cameras, depth sensors, and inertial measurement units to capture data about the environment and then uses that data to create a map of the surroundings of a device while simultaneously determining the device's location within that map. This allows, for example, an AR device to accurately place digital objects in the real world and track their position as a user moves and/or as objects move.

The term "VIO" (Visual-Inertial Odometry) is used herein to refer to a system that combines data from an IMU and a camera to estimate the position and orientation of an object in real-time. In some examples, a VIO system may form part of a SLAM system, e.g., to perform the "Localization" function of the SLAM system.

The term "six-degrees of freedom tracking system" (referred to hereafter simply as a "6DOF tracker") is used herein to refer to a device that tracks rotational and translational motion. For example, the 6DOF tracker can track whether the user has rotated their head and moved forward or backward, laterally, or vertically and up or down. The 6DOF tracker may include a SLAM system or a VIO system that relies on data acquired from multiple sensors (e.g., depth cameras, inertial sensors). The 6DOF tracker analyzes data from the sensors to accurately determine the pose of a device.

A "user session" is used herein to refer to an operation of an application during periods of time. For example, a session may refer to an operation of the AR application between the time the user puts on a head-wearable AR device and the time the user takes off the head-wearable device. In some examples, the user session starts when the AR device is turned on or is woken up from sleep mode and stops when the AR device is turned off or placed in sleep mode. In another example, the session starts when the user runs or starts the AR application, or runs or starts a particular feature of the AR application, and stops when the user ends the AR application or stops the particular features of the AR application.

The term "intrinsic parameters" is used herein to refer to parameters that are based on conditions internal to a device or component. For example, intrinsic parameters of an AR device's camera can include one or more of: camera focal lengths, image center, pixel size, image resolution, camera field of view, internal temperature of the camera, and internal measurement offset. As another non-limiting example, intrinsic parameters of an AR device's display can include one or more of: display size, pixel resolution, viewing angle, display field of view, brightness, refreshing rate, response time, display curvature, display material properties, and bending characteristics.

The term "extrinsic parameters" is used herein to refer to parameters that are based on conditions external to a device or component. For example, extrinsic parameters of an AR device's camera can include one or more of: distance from an object of interest, lighting, ambient temperature (e.g., temperature of an environment in which the camera operates), and position and orientation (e.g., pose) of the camera relative to other sensors. As another non-limiting example, extrinsic parameters of an AR device's display can include: environmental lighting, distance to a user's eyes, viewer's orientation and position relative to display, ambient temperature, display orientation or position. An example of an extrinsic parameter related to both the camera and the display is a device's camera-to-display calibration parameters, e.g., factory calibration information. Another example of an extrinsic parameter related to both the camera and the display is the relative pose between a device's camera(s), display(s) and/or other sensor(s).

An AR device such as a head-wearable device may be implemented with a transparent or semi-transparent display through which a user of the AR device can view the surrounding environment. Such devices enable a user to see through the transparent or semi-transparent display to view the surrounding environment, and also to see objects (e.g., virtual objects such as 3D renderings, images, video, text, and so forth) that are generated for display to appear as a part of, and/or overlaid upon, the surrounding environment.

As mentioned above, an AR device can include, or be connected to, an object tracking system that tracks an object captured by one or more optical components (e.g., one or more cameras) of the AR device. The object tracking system may be located device-side or server-side, or may have different components distributed across devices and/or servers.

In some examples, the object tracking system receives a sequence of images and tracks the object in a three-dimensional space, within each image. An object tracking system may utilize various parameters to track an object. These parameters may include visual information (e.g., recognizing and tracking an object based on distinctive features), spatial information (e.g., using depth sensors and/or other spatial data to determine the object's location), motion information (e.g., using a 6DOF tracker and/or computer vision algorithms to track motion and position over time), and predictive information (e.g., using a machine learning model to predict object motion).

It may be undesirable or infeasible to feed a "raw" (unprocessed) image captured by a camera of an AR device directly to an object tracking system for object detection or tracking purposes. For example, a display of the AR device may have a smaller field of view than a camera of the AR device, making it desirable to focus only on a display overlapping region of the captured image (e.g., to exclude regions in the raw captured image that do not overlap with a display area). Furthermore, the object being tracked may only cover a certain portion of the image, making it desirable to feed only that portion of the image to the object tracking system to facilitate object detection and improve processing efficiencies. This portion of the image may be referred to as a "region of interest." Furthermore, the object tracking system may require, as input, an image in a size (e.g., a predefined size) that is different from the size of the raw image and/or the abovementioned display overlapping region, necessitating cropping and/or scaling of the raw image.

Accordingly, the raw images captured by an optical component may be processed into images that are suitable, or more suitable, for use by the object tracking system. In some cases, this includes identifying the region of interest in an image and performing a crop-and-scale operation directed at the region of interest, e.g., to generate an image that (a) includes, primarily or exclusively, the region of interest, and (b) corresponds to a predefined size required by the object tracking system. In the context of the present disclosure, the term "size," when used to refer to an image, refers to the physical size thereof (e.g., 800 pixels wide and 600 pixels tall), as opposed to the file size (e.g., the storage space required to save the image).

One approach to image processing in this context involves applying a fixed rule to each captured image in a stream of images (each image may be referred to as a frame). For example, the captured image can be scaled up (or scaled down) such that the region of interest corresponds to the size required by the object tracking system, and the region of interest can then be cropped from the scaled image to obtain an input image to feed to the object tracking system. However, a technical problem with this technique is that it may be computationally expensive to scale each (entire) captured frame in an indiscriminate manner.

Alternatively, the captured image can first be cropped (using a cropping operation directed at the region of interest), after which the cropped area can be scaled to the size required by the object tracking system. However, a technical problem with this technique is that performing a cropping operation prior to scaling may not always yield an optimal or near-optimal input image for the object tracking system. For example, depending on the scale interpolation method employed by an AR device, pixels outside of a region of interest may have an influence on pixels inside the region of interest. More specifically, if an image is cropped first to isolate a region of interest, pixels outside of the region of interest are removed. The removed pixels may then no longer be available or useable for pixel interpolation (e.g., bilinear interpolation) in the subsequent scaling step, possibly leading to a result that is unsatisfactory compared to a result that could have been obtained by scaling first (prior to cropping the region of interest). It may thus be undesirable to crop each and every frame prior to scaling in an indiscriminate manner.

Examples of the present disclosure provide an adaptive image processing technique in which a crop-and-scale order is dynamically determined. The image processing technique is automatically adjustable to obtain a cropped and scaled region of an original camera image to be used as an input image of a detector such as an object tracking system. As a result, technical challenges associated with employing a fixed or static image processing technique can be addressed or alleviated.

In some examples, an AR device, e.g., a head-wearable AR device, can include one or more cameras for observing and capturing real-world scenes. The AR device has an object tracking system that uses, as input, part of an image captured by the camera. The input is analyzed to detect or track (e.g., estimate the position of) an object in a three-dimensional space. A size of the image required by the object tracking system may be fixed or predetermined, requiring an image captured by the camera to be cropped and scaled to the appropriate size. The AR device may be configured to determine, for a specific frame, a region of interest and a crop-and-scale order. The region of interest or the crop-and-scale order, or both, may be determined based on data associated with a previous frame, including one or more of: object tracking status (e.g., three-dimensional position, velocity data, or two-dimensional projection pixel locations), AR device motion (e.g., from an IMU or SLAM system), frame bending estimations, camera to display transformation information (e.g., factory calibration information), or data relating to a padding region (e.g., a predefined padding region added to make an object tracking system more robust). In other words, a crop-and-scale order may be dynamically determined for a current frame and adjusted if required.

Examples of the present disclosure may be utilized to track objects or other targets of interest or for applying augmentations (e.g., image filters, overlays, or modifications) to target objects or areas displayed to a user via an AR application on an AR device.

In some examples, a first input image is captured by a camera of the AR device and the first input image is used as a basis for generating a first output image required by an object tracking system. The first output image may be a cropped and scaled image generated or derived from the first input image. The first input image may be part of a sequence of input images (frames) captured by the camera.

A region of interest of the first input image is determined. The region of interest is associated with an object that is being tracked using an object tracking system and can be determined based on various object tracking parameters (e.g., historic object tracking data, historic device tracking data, object tracking pose forecasts, and/or device tracking pose forecasts). The object tracking parameters may thus include object tracking data from previous frames, camera intrinsic parameters, camera extrinsic parameters, display intrinsic parameters and display extrinsic parameters. Determining the region of interest of the first input image may include calculating a display overlapping region of the first input image and determining the region of interest within the display overlapping region based on the abovementioned parameters. In some examples, the display overlapping region is defined as the region of overlap between the display field of view and the camera field of view.

In some examples, a crop-and-scale order of an image processing operation directed at the region of interest is determined for the first input image. One or more object tracking parameters may be used to determine the crop-and-scale order. The crop-and-scale order is dynamically adjustable between a first order and a second order. The one or more object tracking parameters may comprise object tracking data for a previous input image (previous frame) captured by the camera of the AR device, with the crop-and-scale order for the first input image being automatically determined based at least in part on the object tracking data for the previous input image. In some examples, the first order is a crop-then-scale order in which cropping is automatically performed prior to scaling to obtain an output image of a predefined size, and the second order is a scale-then-crop order in which scaling is automatically performed prior to cropping to obtain an output image of the predefined size.

The first order may be stored as a default order for the image processing operation in a storage component associated with the AR device, such that the crop-and-scale order is dynamically and automatically adjustable from the first order to the second order based on the one or more object tracking parameters. In some examples, other factors may be used to adaptively switch between orders, e.g., a machine learning model's accuracy requirements or a device's power consumption or battery status.

An output image is generated from the input image via performing the image processing operation according to the determined crop-and-scale order for the particular input image, and based on the region of interest. The output image can be accessed by the object tracking system to track the object. As mentioned, the first output image may be defined by a cropped and scaled image obtained from within the first input image using the image processing operation. The cropped and scaled image may have a predefined size, and the first input image may have a size that differs from the predefined size.

This process may substantially be repeated for succeeding frames in the sequence. For example, a second input image may be processed substantially as described above to obtain a second output image for use by the object tracking system in further tracking the object in question. For example, an image processing system may determine that cropping should be performed prior to scaling for the first input image to reduce computational resource requirements, and then dynamically adjust this order for the second input image, e.g., as a result of determining that the object is close to a predefined cropping area border, making it more accurate to scale prior to cropping.

It is noted that, in some examples, the region of interest does not have a fixed size, and the size may vary between frames. Further, in some examples, the output image (e.g., cropped and scaled region) has a fixed size that matches a size accepted or required by an object tracking system. However, in other examples, the size that is accepted or required by the object tracking system may also be dynamic, or the object tracking system may be configured to accept inputs in several sizes. For example, the object tracking system may switch between a mode in which it takes in output images of a larger size, e.g., when more accurate results are required, and a mode in which it takes in output images of a smaller size to improve runtime or reduce computational load. Accordingly, systems described herein may be configured to adaptively select an output image size that matches one or more sizes associated with the object tracking system.

One or more of the methodologies described herein facilitate solving the technical problem of saving computing resources by utilizing efficient image processing techniques while ensuring that an object is accurately detected or tracked. According to some examples, the presently described method provides an improvement to an operation of the functioning of a computer by dynamically detecting a cropping and scaling order to perform in respect of a particular frame, while reducing computational expenses that may be associated with certain static rule-based image processing operations. As such, one or more of the methodologies described herein may obviate a need for certain efforts or computing resources. Examples of such computing resources include processor cycles, network traffic, memory usage, data storage capacity, power consumption, network bandwidth, and cooling capacity.

Other technical features may be readily apparent to one skilled in the art from the following figures, descriptions, and claims.

FIG. 1 is a network diagram illustrating a network environment 100 suitable for operating an AR device 110, according to some examples. The network environment 100 includes an AR device 110 and a server 112, communicatively coupled to each other via a network 104. The AR device 110 and the server 112 may each be implemented in a computer system, in whole or in part, as described below with respect to FIG. 15. The server 112 may be part of a network-based system. For example, the network-based system may be or include a cloud-based server system that provides additional information, such as virtual content (e.g., three-dimensional models of virtual objects, or augmentations to be applied as virtual overlays onto images depicting real-world scenes) to the AR device 110.

A user 106 operates the AR device 110. The user 106 may be a human user (e.g., a human being), a machine user (e.g., a computer configured by a software program to interact with the AR device 110), or any suitable combination thereof (e.g., a human assisted by a machine or a machine supervised by a human). The user 106 is not part of the network environment 100, but is associated with the AR device 110.

The AR device 110 may be a computing device with a display such as a smartphone, a tablet computer, or a wearable computing device (e.g., watch or glasses). The computing device may be hand-held or may be removably mounted to a head of the user 106. In one example, the display may be a screen that displays what is captured with a camera of the AR device 110. In another example, the display of the device may be transparent or semi-transparent such as in lenses of wearable computing glasses. In other examples, the display may be a transparent display such as a windshield of a car, plane, truck. In another example, the display may be non-transparent and wearable by the user to cover the field of vision of the user.

The user 106 operates an application of the AR device 110. The application may include an AR application configured to provide the user 106 with an experience triggered or enhanced by a physical object 108, such as a two-dimensional physical object (e.g., a picture), a three-dimensional physical object (e.g., a statue), a location (e.g., at factory), or any references (e.g., perceived corners of walls or furniture, QR codes) in the real-world physical environment. For example, the user 106 may point a camera of the AR device 110 to capture an image of the physical object 108 and a virtual overlay may be presented over the physical object 108 via the display.

The AR device 110 includes tracking components (not shown). The tracking components track the pose (e.g., position, orientation, and location) of the AR device 110 relative to the real-world environment 102 using optical sensors (e.g., depth-enabled 3D camera, and image camera), inertial sensors (e.g., gyroscope, accelerometer, or the like), wireless sensors (e.g., Bluetooth™ or Wi-Fi), GPS sensor, and audio sensor to determine the location of the AR device 110 within the real-world environment 102.

In some examples, the server 112 may be used to detect and identify the physical object 108 based on sensor data (e.g., image and depth data) from the AR device 110, determine a pose of the AR device 110 and the physical object 108 based on the sensor data. The server 112 can also generate a virtual object based on the pose of the AR device 110 and the physical object 108. The server 112 communicates the virtual object to the AR device 110. The AR device 110 or the server 112, or both, can also perform image processing, object detection and object tracking functions based on images captured by the AR device 110 and one or more parameters internal or external to the AR device 110. The object recognition, tracking, and AR rendering can be performed on either the AR device 110, the server 112, or a combination between the AR device 110 and the server 112. Accordingly, while certain functions are described herein as being performed by either an AR device or a server, the location of certain functionality may be a design choice. For example, it may be technically preferable to deploy particular technology and functionality within a server system initially, but later to migrate this technology and functionality to a client installed locally at the AR device where the AR device sufficient processing capacity.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 15. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., AR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
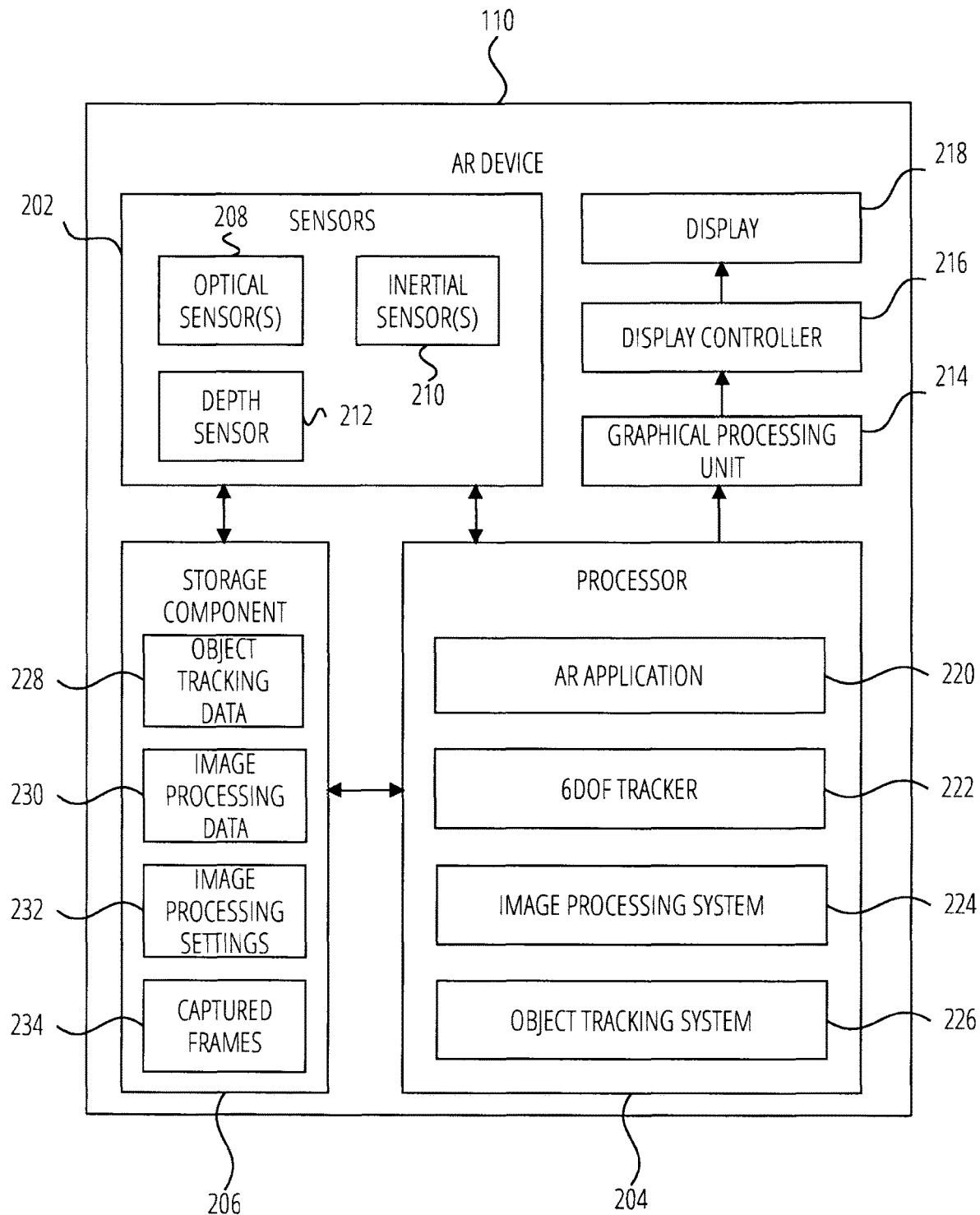
FIG. 2 is a block diagram illustrating an AR device according to some examples.

FIG. 2 is a block diagram illustrating modules (e.g., components) of the AR device 110, according to some examples. The AR device 110 includes sensors 202, a processor 204, a storage component 206, a graphical processing unit 214, a display controller 216, and a display 218. Examples of AR device 110 include a wearable computing device, a tablet computer, a navigational device, a portable media device, or a smart phone.

The sensors 202 include one or more optical sensor(s) 208, one or more inertial sensor(s) 210, and a depth sensor 212. The optical sensor(s) 208 includes a combination of a color camera, a thermal camera, a depth sensor, and one or multiple grayscale, global shutter tracking cameras. The inertial sensor(s) 210 includes a combination of a gyroscope, accelerometer, and a magnetometer. In some examples, the inertial sensor(s) 210 includes one or more IMU. The depth sensor 212 includes a combination of a structured-light sensor, a time-of-flight sensor, passive stereo sensor, and an ultrasound device, time-of-flight sensor. Other examples of sensors 202 include a proximity or location sensor (e.g., near field communication, GPS, Bluetooth™, Wi-Fi), an audio sensor (e.g., a microphone), or any suitable combination thereof. It is noted that the sensors 202 described herein are for illustration purposes and the sensors 202 are thus not limited to the ones described above.

The processor 204 includes an AR application 220, a 6DOF tracker 222, an image processing system 224, and an object tracking system 226. The AR device 110 detects and identifies a physical environment or the physical object 108 using computer vision. The AR device 110 communicates with the object tracking system 226 (described below) to enable tracking of objects in the physical environment, e.g., hand tracking or body movement tracking. The AR device 110 may retrieve a virtual object (e.g., 3D object model) based on an identified physical object 108 or physical environment, or retrieve an augmentation to apply to the physical object 108. The graphical processing unit 214 displays the virtual object, augmentation, or the like. The AR application 220 includes a local rendering engine that generates a visualization of a virtual object overlaid (e.g., superimposed upon, or otherwise displayed in tandem with) on an image of the physical object 108 captured by the optical sensor(s) 208. A visualization of the virtual object may be manipulated by adjusting a position of the physical object 108 (e.g., its physical location, orientation, or both) relative to the optical sensor(s) 208. Similarly, the visualization of the virtual object may be manipulated by adjusting a pose of the AR device 110 relative to the physical object 108.

The 6DOF tracker 222 estimates a pose of the AR device 110. For example, the 6DOF tracker 222 uses image data and corresponding data from the optical sensor(s) 208 and the inertial sensor(s) 210 to track a location and pose of the AR device 110 relative to a frame of reference (e.g., real-world environment 102). In one example, the 6DOF tracker 222 uses the sensor data to determine the three-dimensional pose of the AR device 110. The three-dimensional pose is a determined orientation and position of the AR device 110 in relation to the user's real-world environment 102. For example, the 6DOF tracker 222 may use images of the user's real-world environment 102, as well as other sensor data to identify a relative position and orientation of the AR device 110 from physical objects in the real-world environment 102 surrounding the AR device 110. The 6DOF tracker 222 continually gathers and uses updated sensor data describing movements of the AR device 110 to determine updated three-dimensional poses of the AR device 110 that indicate changes in the relative position and orientation of the AR device 110 from the physical objects in the real-world environment 102. The 6DOF tracker 222 provides the three-dimensional pose of the AR device 110 to the graphical processing unit 214.

The image processing system 224 obtains data from the optical sensor(s) 208, the depth sensor 212, the 6DOF tracker 222 and the storage component 206, and dynamically determines a display overlapping region in a particular frame. The display overlapping region is the portion of a captured image that overlaps with the display 218. In other words, the display overlapping region is the portion of the field of view of the camera that overlaps with the field of the view of the display 218. The image processing system 224, when performing object tracking related image processing, further determines a region of interest in a particular frame. The image processing system 224 is configured adaptively to determine a crop-and-scale order for an image processing operation, and to perform the image processing operation in accordance with the crop-and-scale order for a specific frame, based on the region of interest (e.g., a region of interest within a display overlapping region for a particular frame). The image processing operation may include performing cropping and scaling operations directed at an identified region of interest to generate, from an input image, an output image that is suitable for use by the object tracking system 226.

The image processing system 224 may access a live stream from a current user session. For example, the image processing system 224 retrieves images from the optical sensor(s) 208 and corresponding data from the 6DOF tracker 222. The image processing system 224 uses images from the live stream, the tracking data associated with each image, together with data stored in the storage component 206, to identify regions of interest and perform the image processing operations.

In some examples, the object tracking system 226 builds a model of the real-world environment 102 based on tracked visual features and/or is configured to track an object of interest captured by the optical sensor(s) 208. In some examples, the object tracking system 226 implements an object tracking machine learning model to track the physical object 108. The object tracking machine learning model may comprise a neural network trained on suitable training data to identify and track objects in a sequence of frames captured by the AR device 110. The machine learning model may, in some examples, be known as a core tracker. A core tracker is used in computer visions systems to track the movement of an object in a sequence of images or videos. It typically uses an object's appearance, motion, landmarks, and/or other features to estimate location in subsequent frames.

In some examples, the object tracking system 226 requires, as input, images of a predefined size. Accordingly, the image processing operation may be performed by the image processing system 224 to generate output images in the predefined size, which are then fed to the object tracking system 226 for tracking objects of interest.

The display 218 includes a screen or monitor configured to display images generated by the processor 204. In some examples, the display 218 may be transparent or semi-transparent so that the user 106 can see through the display 218 (in AR use cases). In another example, the display 218, such as a LCOS (Liquid Crystal on Silicon) display, presents each frame of virtual content in multiple presentations. It will be appreciated that an AR device may include multiple displays, e.g., in the case of AR glasses, a left eye display and a right eye display. A left eye display may be associated with a left lateral side camera, with frames captured by the left lateral side camera being processed specifically for the left eye display. Likewise, the right eye display may be associated with a right lateral side camera, with frames captured by the right lateral side camera being processed specifically for the right eye display.

The graphical processing unit 214 includes a render engine (not shown) that is configured to render a frame of a 3D model of a virtual object based on the virtual content provided by the AR application 220 and the pose of the AR device 110. In other words, the graphical processing unit 214 uses the three-dimensional pose of the AR device 110 to generate frames of virtual content to be presented on the display 218. For example, the graphical processing unit 214 uses the three-dimensional pose to render a frame of the virtual content such that the virtual content is presented at an orientation and position in the graphical processing unit 214 to properly augment the user's reality. As an example, the graphical processing unit 214 may use the three-dimensional pose data to render a frame of virtual content such that, when presented on the graphical processing unit 214, the virtual content overlaps with a physical object in the user's real-world environment 102. The graphical processing unit 214 can generates updated frames of virtual content based on updated three-dimensional poses of the AR device 110 and updated tracking data generated by the object tracking system 226, which reflect changes in the position and orientation of the user in relation to physical objects in the user's real-world environment 102, thereby resulting in a more immersive experience.

The graphical processing unit 214 transfers the rendered frame to the display controller 216. The display controller 216 is positioned as an intermediary between the graphical processing unit 214 and the display 218, receives the image data (e.g., rendered frame) from the graphical processing unit 214, re-projects the frame (by performing a warping process) based on a latest pose of the AR device 110 (and, in some cases, object tracking pose forecasts or predictions), and provides the re-projected frame to the graphical processing unit 214. It will be appreciated that, in examples where an AR device includes multiple displays, each display may have a dedicated graphical processing unit and/or display controller.

The storage component 206 may store various data, such as object tracking data 228, image processing data 230, image processing settings 232, and captured frames 234. The object tracking data 228 includes, for example, object tracking information from previously captured frames. The image processing data 230 includes, for example, details of image processing steps carried out in respect of previously captured frames. The image processing settings 232 include, for example, image processing algorithms and default settings for image processing, such as algorithms regulating cropping and scaling of input images. The captured frames 234 may include frames captured during a current and/or previous user session.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

It will be appreciated that, where an AR device includes multiple displays, steps may be carried out separately and substantially in parallel for each display, in some examples. For example, an AR device may capture separate images for a left eye display and a right eye display, and separate outputs for each eye to create a more immersive experience and to adjust the focus and convergence of the overall view of a user for a more natural, three-dimensional view. Thus, while a single camera and a single output display may be discussed to describe some examples, similar techniques may be applied in devices including multiple cameras and multiple displays.

Figure 3:
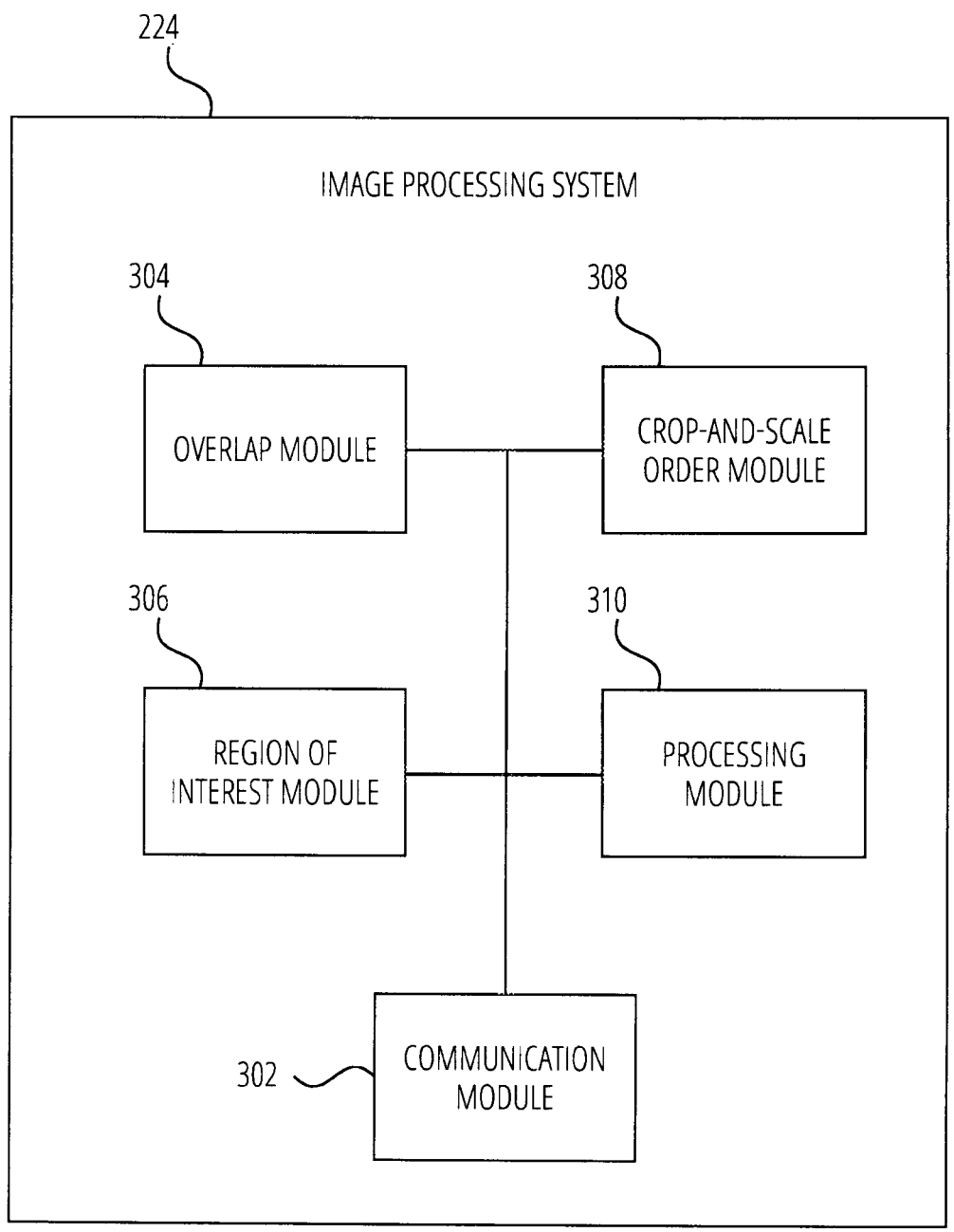
FIG. 3 is a block diagram illustrating components of an image processing system of an AR device, according to some examples.

FIG. 3 is a block diagram illustrating certain components of the image processing system 224, according to some examples. The image processing system 224 includes a communication module 302, an overlap module 304, a region of interest module 306, a crop-and-scale order module 308, and a processing module 310.

In some examples, the image processing system 224 utilizes various object tracking parameters to determine a cropped and scaled region within an input image captured by a camera of the AR device 110, with that cropped and scaled region being generated as an output image that is, in turn, supplied to the object tracking system 226 as an object tracking input. The image processing system 224 may supply a sequence of output images to the object tracking system 226 corresponding to a sequence of frames captured by the camera during a user session. It will be appreciated that image processing may occur substantially in real-time, e.g., to allow for real-time object tracking, on-target display augmentations, and the like.

The communication module 302 is responsible for enabling the image processing system 224 to access input images captured by a camera, and for transmitting output images to the object tracking system 226 for object tracking purposes. The communication module 302 may also communicate with the storage component 206 of the AR device 110 for data storage and retrieval.

The overlap module 304 is configured to determine, for a particular input image captured by a camera of the AR device 110, a display overlapping region. The display overlapping region is a region of overlap between the captured image and a display area defined by the display 218 (e.g., the display field of view). The overlap module 304 may use camera and display intrinsic parameters and camera and display extrinsic parameters to determine the display overlapping region. For example, one or more of camera focal length, image center, display field of view, and the relative pose between the display 218 and the camera (and, in some examples, other sensors) may be analyzed to determine the display overlapping region.

For a particular frame, the display overlapping region may be calculated at least partially based on a camera-to-target distance. The distance may be determined based on a previous tracking result (e.g., for a preceding frame), or may be an assumption or prediction based on one or more of the aforementioned parameters. The display overlapping region may be used as a basis for a crop-and-scale operation, which is described in greater detail below. Typically, the object being detected or tracked may be depicted within the display overlapping region, making the display overlapping region a useful starting point for the crop-and-scale operation. Thus, in some examples, the phrase "processing of the input image to generate an output image" refers to cropping and scaling operations starting from the display overlapping region. However, a larger area or even the entire input image may in some examples be used as a starting point for the crop-and-scale operation, e.g., where only part of the object is visible within the display overlapping region.

As alluded to above, it should be appreciated that multiple display overlapping regions may be calculated, e.g., a left-side display overlapping region and a right-side display overlapping region may be calculated in examples such as those described with reference to FIG. 12 and FIG. 13 below.

The region of interest module 306 is configured to determine a region of interest of the relevant input image. As mentioned, the region of interest is associated with the object that is being tracked using the object tracking system 226 and, in some examples, may be a region within the display overlapping region. The region of interest can be determined based on predefined object tracking parameters, such as object tracking data from a preceding frame, predicted object position or motion from the preceding frame, as well as display intrinsic parameters and camera and display extrinsic parameters (e.g., as mentioned above, camera focal length, image center, display field of view, or the relative pose between sensors or components of the AR device).

The crop-and-scale order module 308 is configured to determine, for each input image and based on one or more of the object tracking parameters, a crop-and-scale order of an image processing operation directed at the region of interest of that input image. The crop-and-scale order module 308 may thus determine how to crop and scale the input image to arrive at an output image suitable for feeding to the object tracking system 226. In some examples, the crop-and-scale order is dynamically and automatically adjustable between a first order and a second order, as will be described in greater detail with reference to FIG. 4 to FIG. 10 below.

The processing module 310 processes the input image, according to the crop-and-scale order determined for the frame, and generates an output image. The output image is, in some examples, a scaled and cropped region of the original input image, determined as optimal or near-optimal for the particular frame and object tracking status.

In some examples, the order of scaling and cropping operations may have a notable effect on the output image ultimately accessed by the object tracking system 226. Scaling the entire input image, or the entire display overlapping region, in each case (e.g., as a fixed rule), may be undesirable, for instance, due to it being overly computationally expensive. On the other hand, as explained above, depending on the scale interpolation method employed in an AR device or system, pixels outside a cropped region may have an influence on pixels inside a cropped region and removing pixels by cropping prior to scaling can have a downstream impact on quality or accuracy.

Determining whether a scaled and cropped region obtained as an output image is "optimal" or "near-optimal" may depend on the specific implementation or use case. However, in some examples, obtaining or determining an "optimal" or "near-optimal" region (or crop-and-scale order) involves balancing several technical objectives (some of which may be regarded as competing technical objectives), such as one or more of:

- The desired output image should cover the overlapping region between the camera field of view and the display field of view.
- The desired output image should cover the target object that is being tracked, e.g., using the object tracking system 226.
- The desired output image should include the region of interest together with a padding area to compensate for potential errors, e.g., when an object is moving in a manner that is different than predicted based on a previous frame.
- The output image should provide a region that closely surrounds the target object, e.g., to ensure that most of the data being fed to the object tracking system 226 is relevant to a tracking operation. Therefore, in some examples, a compromise between a relatively large padding area to compensate for potential errors, and a relatively small (or no) padding area in an attempt to feed predominantly relevant parts of an image to a tracker, is sought.
- It may be desirable to balance the need or desire to scale first (prior to cropping) to obtain a more accurate result, with the need or desire to crop first for better runtime or lower power consumption.

In some examples, where a cropping operation is performed prior to scaling, the cropping operation may be a so-called "pre-crop" to remove a certain part of the input image, or display overlapping region, with a final crop being applied after scaling. A pixel border width may be dependent on the interpolation method used for scaling. A crop-then-scale operation may be followed by a final cropping operation. These and other aspects are described further below, according to some examples.

Figure 4:
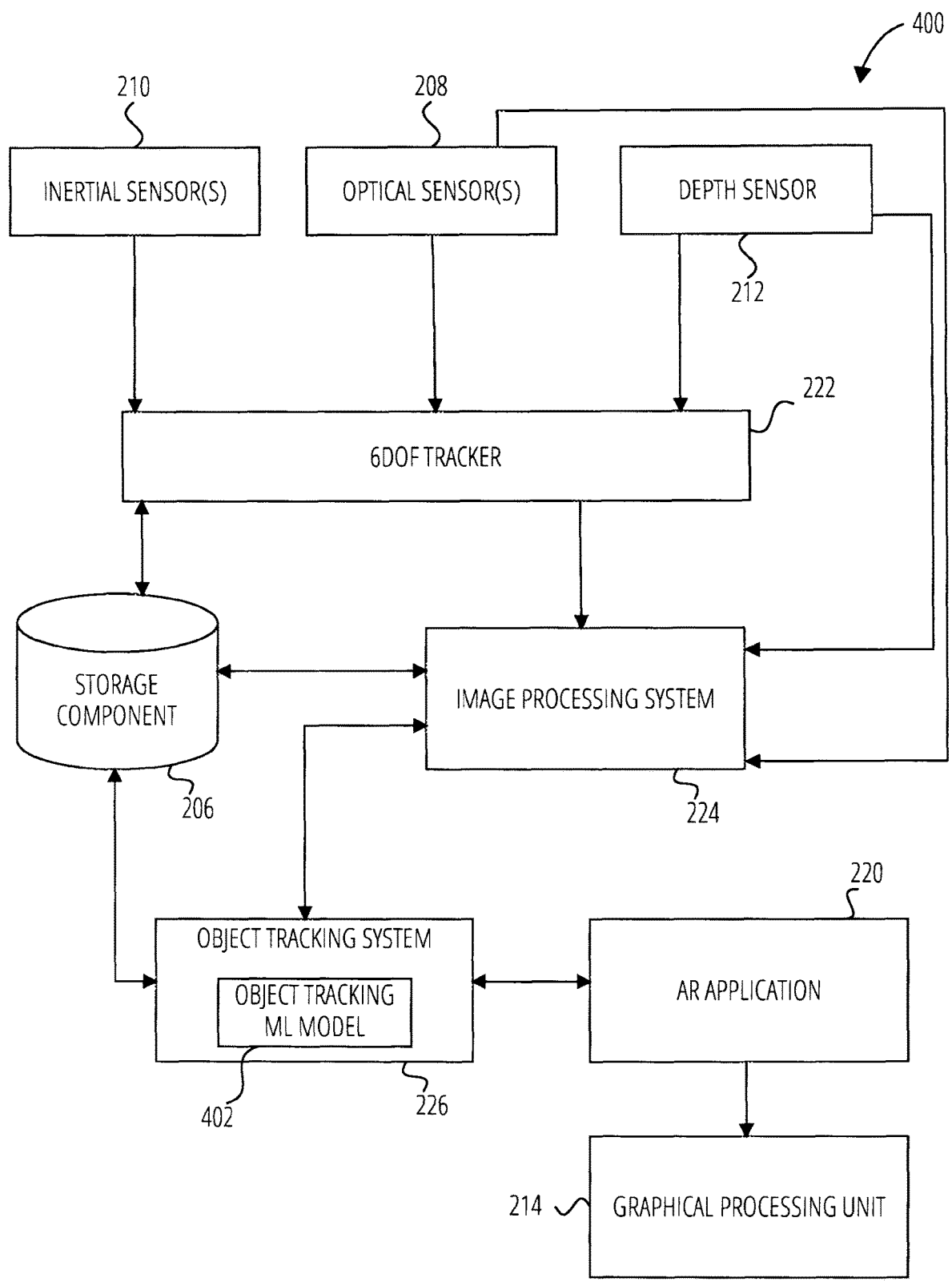
FIG. 4 is a block diagram illustrating interaction between certain components of an AR device in a process involving adaptive image processing, according to some examples.

The block diagram 400 of FIG. 4 illustrates interaction between certain functional components of the AR device 110 in an adaptive image processing technique, according to some examples.

During a user session, the 6DOF tracker 222 accesses inertial sensor data from the inertial sensor(s) 210 (e.g., IMU data), optical sensor data from the optical sensor(s) 208 (e.g., camera data), and depth sensor data from the depth sensor 212. The 6DOF tracker 222 determines a pose (e.g., location, position, orientation, or inclination) of the AR device 110 relative to a frame of reference (e.g., real-world environment 102). In some examples, the 6DOF tracker 222 includes a SLAM system which may in turn incorporate or be connected to a VIO system. The 6DOF tracker 222 may estimate the pose of the AR device 110 based on 3D maps of feature points from images captured with the optical sensor(s) 208, the inertial sensor data captured with the inertial sensor(s) 210, and optionally depth sensor data from the depth sensor 212.

The 6DOF tracker 222 provides pose data to the image processing system 224. The camera (optical sensor(s) 208) of the AR device 110 may capture a plurality of images defining a sequence of frames, and corresponding image data (e.g., a live stream of images/frames) can be fed to the image processing system 224. Pose-related data from the 6DOF tracker 222 may be fed to the image processing system 224 and/or stored in the storage component 206, e.g., as part of object tracking data 228. The image processing system 224 may also access the "raw" depth sensor data from the depth sensor 212, as shown in FIG. 4.

The aforementioned data, together with other object tracking data 228 (e.g., tracking data from previous frames) and image processing data 230 (e.g., camera intrinsic parameters, camera extrinsic parameters, display intrinsic parameters, or display extrinsic parameters) may be used by the image processing system 224 to determine the region of interest in a given frame captured by the optical sensor(s) 208. The region of interest is a region within the frame determined to include an object being tracked using the object tracking system 226.

Once the region of interest has been established, and as mentioned above, the image processing system 224 determines the crop-and-scale order for the current frame. The crop-and-scale order may be determined based on one or more object tracking parameters. These parameters may include object tracking data (e.g., pose data, AR device motion prediction, object motion prediction, or object tracking status data). The object tracking data may be based on, or predicted using, data relating to previously captured and analyzed frames. For example, AR device motion and object motion may be predicted for the current frame based on a preceding frame, e.g., the immediately preceding frame. The parameters may further include parameters relating to device hardware, such as an AR device frame bending estimation and a camera-display transformation.

Further, the parameters may include user-defined parameters such as a margin padding value (e.g., a safety margin defined by a user and that is added to the region of interest to ensure that the object is fully captured within the analyzed zone). The user-defined parameters may also include a default setting, e.g., an instruction to apply a crop-then-scale order as a default and to switch to a scale-then-crop order only if a predefined requirement is met (e.g., if the object is closed to a cropping border). Such an instruction may save on computational expenses. User-defined parameters such as the margin padding value or the default setting may be stored in the image processing settings 232.

AR device motion prediction data may be important or useful in applications where AR device motion is dominant (e.g., the wearer of the device is running). In such applications, the image processing system 224 may be configured to take AR device motion predictions into account when determining the region of interest and/or the crop-and-scale order for a current frame. AR device motion predictions may be obtained by the image processing system 224 from, or calculated based on data from, the 6DOF tracker 222 (or a SLAM or VIO system associated with the 6DOF tracker 222), or from the inertial sensor(s) 210.

Object motion prediction data may be important or useful in applications where object motion is dominant (e.g., hand tracking applications). Object motion predictions may be obtained by the image processing system 224 from the object tracking system 226 or calculated from stored object tracking data 228 for previous frames.

In the case of AR glasses, for example, bending estimation may influence cropping and scaling of images. Accordingly, the image processing system 224 may be configured to apply a bending transformation on a camera-to-display calibration, which is taken into account in cropping and scaling calculations.

Once the crop-and-scale order has been determined for the current frame, the image processing system 224 performs the required image processing and provides the output image (e.g., cropped and scale image based on the original current frame) to the object tracking system 226. The object tracking system 226 may implement an object tracking machine learning model 402 that uses the output images obtained from the image processing system 224 to perform object tracking. Object tracking results or outputs may be used by the AR application 220, e.g., to generate and/or accurately locate augmentations or overlays presented to the user on the display 218 after processing by the graphical processing unit 214 and via the display controller 216. The object tracking results or outputs may also be stored in the storage component 206 and/or fed back to the image processing system 224, e.g., to enable the image processing system 224 to utilize object motion predictions in the processing of succeeding frames.

Figure 5:
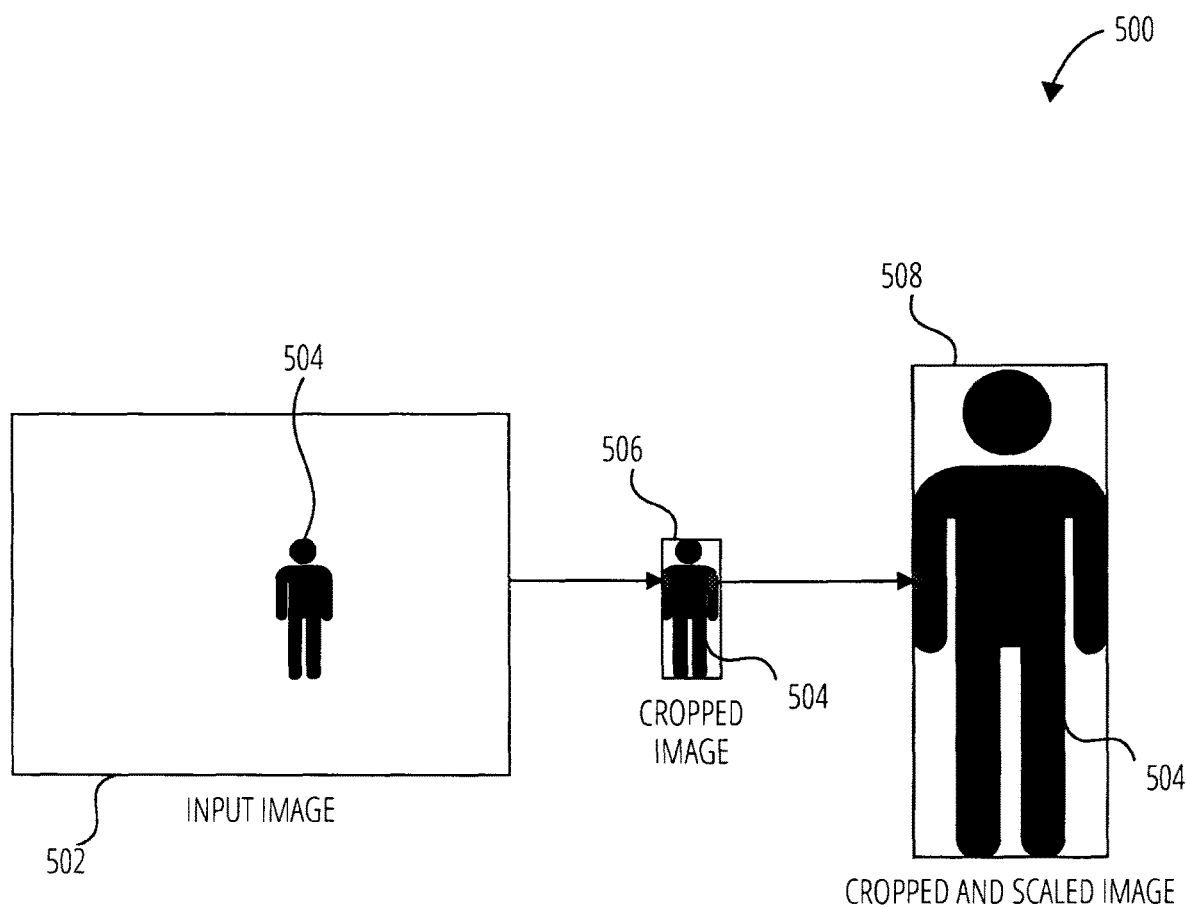
FIG. 5 is a diagrammatic illustration of aspects of an image processing operation, wherein the image processing operation has a crop-then-scale order, according to some examples.
Figure 6:
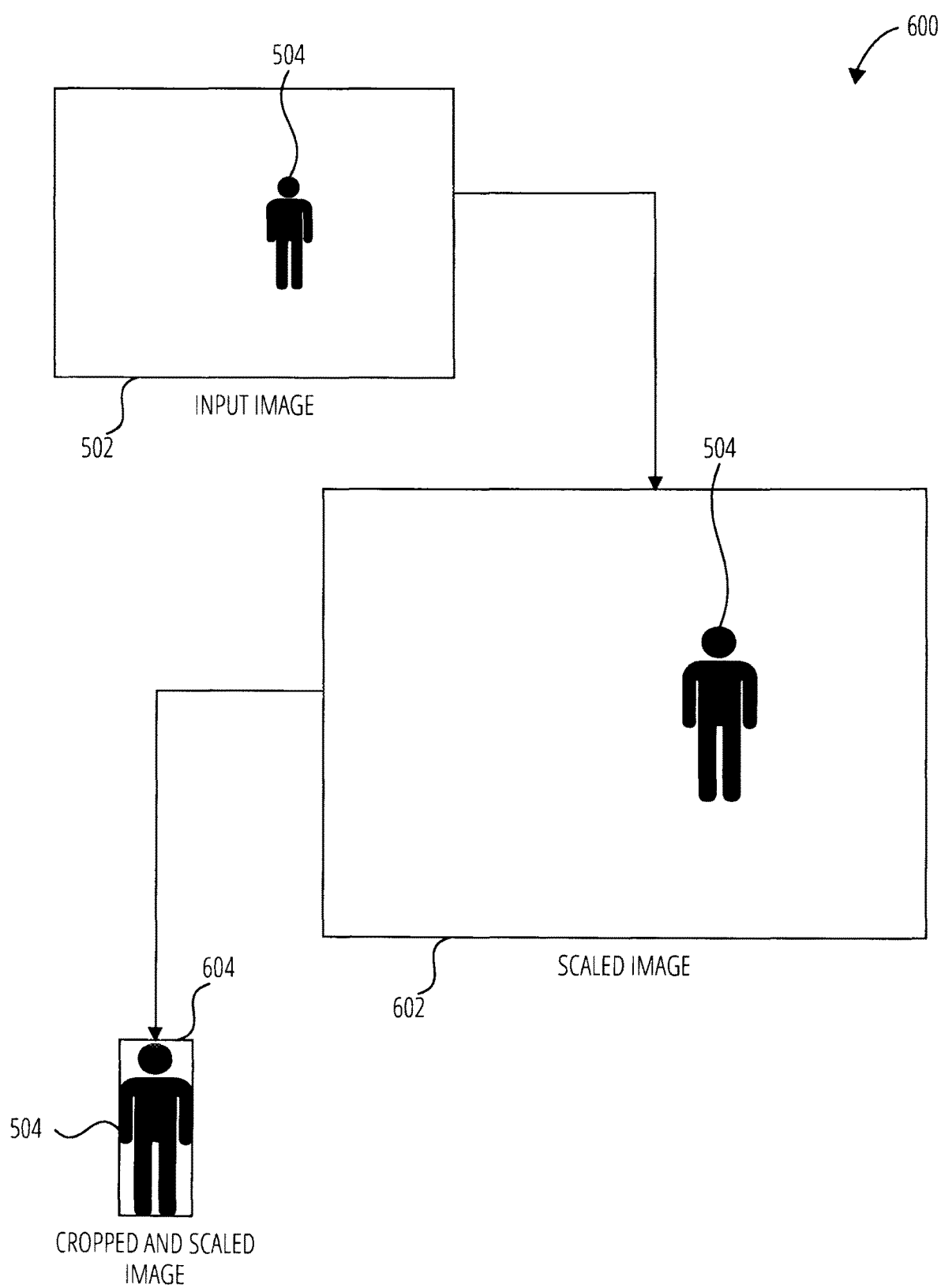
FIG. 6 is a diagrammatic illustration of aspects of an image processing operation, wherein the image processing operation has a scale-then-crop order, according to some examples.

FIG. 5 and FIG. 6 diagrammatically illustrate two different crop-and-scale orders. In the descriptions below, image sizes are indicated by referring to the dimensions of each image in pixels (width×height). The diagrams in these figures are not necessarily drawn to scale and are merely intended to illustrate certain aspects of the present disclosure.

FIG. 5 illustrates an image processing operation 500 that has a crop-then-scale order, according to some examples. An input image 502 depicting an object 504 of interest has a size of 640×480. The region of interest, being the zone containing the object 504, is determined as a 200×400 region and this region is cropped from the input image 502 to generate a cropped image 506, as shown in FIG. 5.

As mentioned above, in some examples, an object tracking system requires, as input, an image of a predefined size. In the examples described with reference to FIG. 5 and FIG. 6, this predefined size is 256×512. The cropped image 506 is scaled to the predefined size so as to generate a cropped and scaled image 508. This cropped and scaled image 508 may then be fed to the object tracking system. In some examples, e.g., where the image is scaled to a size greater than the predefined size required by the object tracking system, the initial crop performed to generate the cropped image 506 may be followed up with a final crop performed after the scaling operation, before feeding the final output image to the object tracking system.

If an input image is cropped first, a border area of the cropped image 506 may contain less information when compared to the same area generated through a scale-then-crop operation. Accordingly, in some cases, it may be desirable to switch from the crop-then-scale order to the scale-then-crop order adaptively and dynamically, e.g., when an object of interest is close to a certain border area.

For instance, a human hand may be close to, or within, a determined border area, making it desirable to switch from the more computationally efficient crop-then-scale order to the scale-then-crop order (which may provide a more accurate or useful output in that particular case).

FIG. 6 illustrates an image processing operation 600 that has a scale-then-crop order, according to some examples. The input image 502 depicting the object 504 of interest has a size of 640×480. The region of interest, being the zone containing the object 504, may be determined. It may further be determined that the scale-then-crop order should be followed for the current frame, resulting in the entire input image 502 first being scaled to generate a scaled image 602 that has a size of 1200×900.

A scale factor can be calculated based on the expected cropped image size (e.g., the predefined size required by the object tracking system) and the region of interest. As discussed elsewhere, this region of interest may be calculated based on a variety of factors. In FIG. 6, the object 504 is a human and the region of interest may be determined based on an object motion prediction generated from a previous frame (in some examples together with camera and display intrinsic and/or extrinsic parameters). In FIG. 6, the scale factor is calculated to be 1,875 (in other words, the input image 502 is to be enlarged by this factor) such that the region of interest matches the predefined size required by the object tracking system.

The (scaled) region of interest is then cropped from the scaled image 602 to generate a cropped and scaled image 604, as shown in FIG. 6. The cropped and scaled image 604 has the predefined size required by the object tracking system (256×512).

Figure 7:
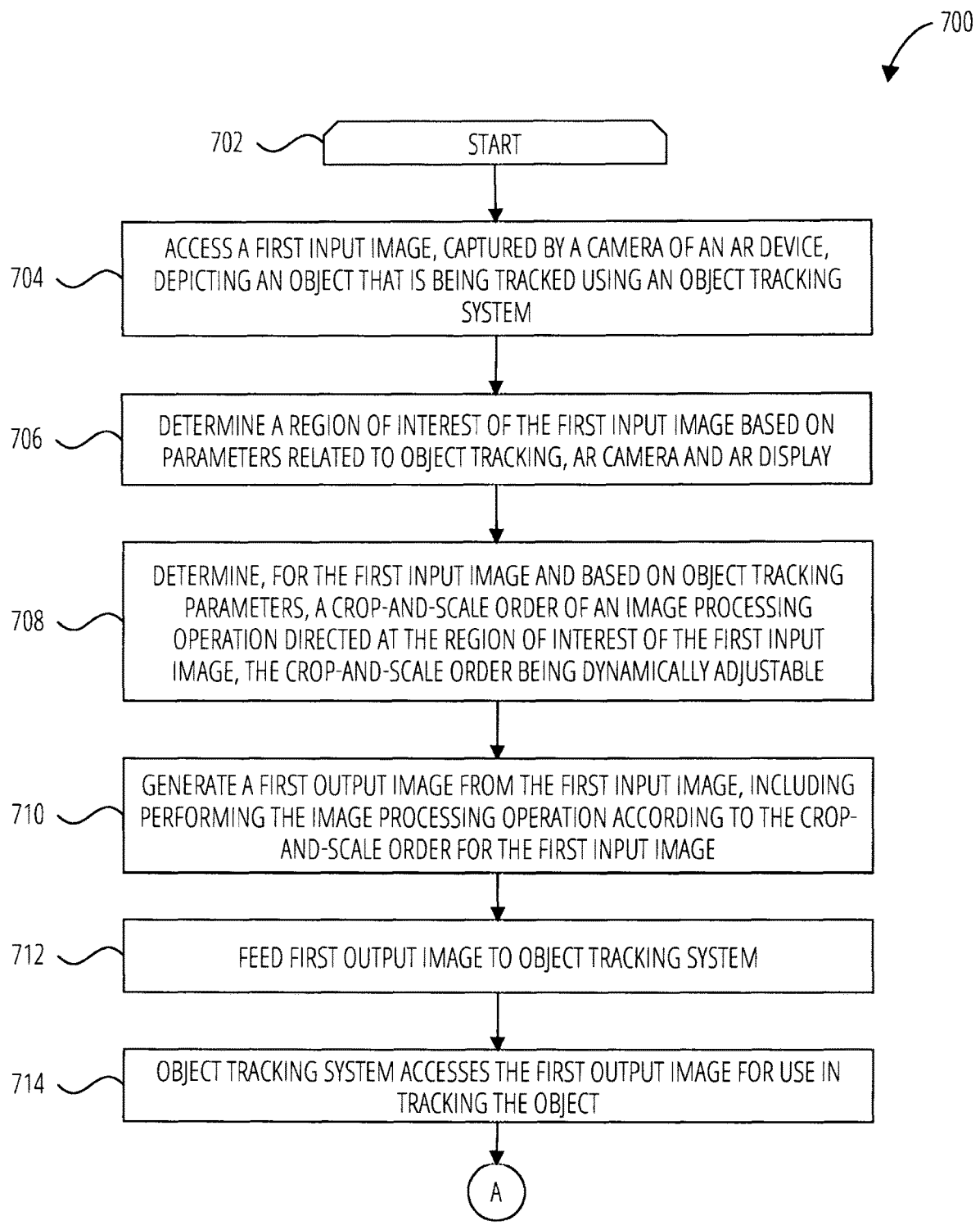
FIG. 7 is a flow diagram illustrating an adaptive image processing method for an AR device, according to some examples.
Figure 8:
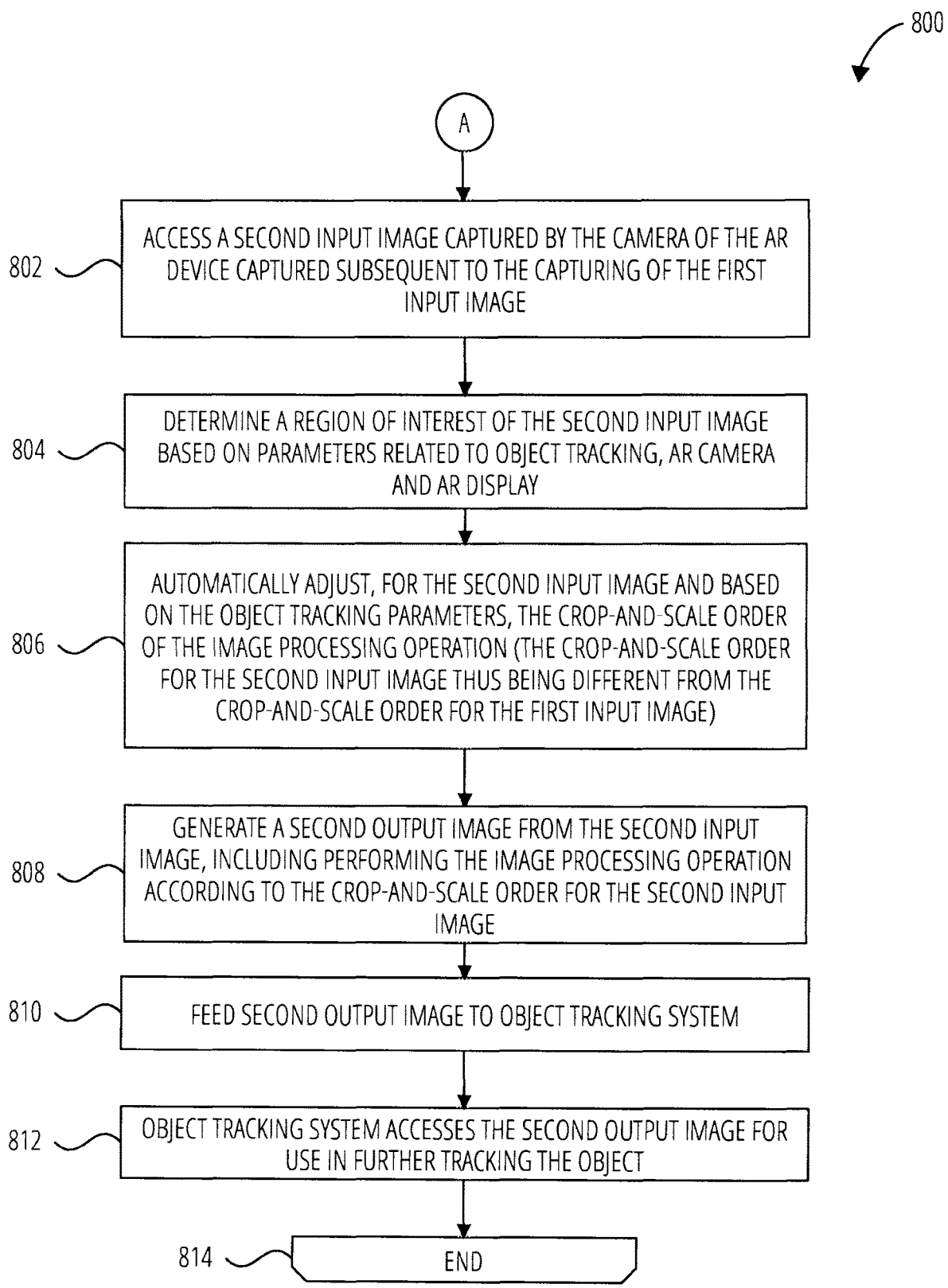
FIG. 8 is a flow diagram further illustrating the adaptive image processing method of FIG. 7, according to some examples.

FIG. 7 and FIG. 8 are flow diagrams 700, 800 respectively illustrating a first stage and a second stage in a method for adaptive image processing using an AR device. Operations in the method may be performed by the image processing system 224 and the object tracking system 226, using components (e.g., modules, engines) described above with respect to FIG. 2 to FIG. 4. Accordingly, the method is described by way of example with reference to the image processing system 224 and the object tracking system 226. However, it shall be appreciated that at least some of the operations of the method may be deployed on various other hardware configurations or be performed by similar components residing elsewhere. The term "block" is used to refer to elements in the drawings for ease of reference and it will be appreciated that each "block" may identify one or more operations, processes, actions, or steps.

Referring firstly to FIG. 7, the method commences at opening loop block 702 and proceeds to block 704, where the image processing system 224 access a first input image captured by a camera of an AR device. The first input image is part of a sequence of frames captured by the camera and depicts an object that is being tracked using the object tracking system 226. The object may be any object of interest, such as a human body, a human hand, an animate or inanimate landmark, etc.

The method proceeds to block 706, where a region of interest of the first input image is determined. As discussed elsewhere herein, the region of interest may be determined based on one or more object tracking parameters, and parameters related to the device's camera and/or display may be taken into account (e.g., one or more of the camera intrinsic parameters, camera extrinsic parameters, display intrinsic parameters, and display extrinsic parameters). For example, device translation and rotation may be determined relative to the object of interest, and a transformation between a device camera and display may be applied to adjust the relevant values.

Bending may also affect data capturing and presentation. Various methods, such as a hardware method or a software method, may be used to calculate the amount/degree of bending. An example of a hardware method is using a strain gauge to measure the bending directly. An example of a software method is using the images of different cameras mounted on an AR device to estimate the relative pose between the cameras, which can be used to provide an estimate of bending. In some examples, bending may affect the relative pose between components more significantly than it affects cameras/lenses themselves. Accordingly, bending may have a significant effect on device extrinsic parameters. Obtaining an estimate of bending may be useful, for instance, to allow for updating one or more extrinsic parameters to obtain more accurate results.

Determining the region of interest may include determining the display overlapping region based on one or more of the object tracking parameters referred to above. As mentioned, in some examples, the display overlapping region is used as a starting point for the crop-and-scale operation.

Once the region of interest has been determined, at block 708, the image processing system 224 determines a crop-and-scale order for the first input image. In some examples, the crop-and-scale order is dynamically adjustable between frames, between a crop-then-scale order and a scale-then-crop order. If the crop-then-scale order is selected, the process involves cropping the region of interest from the first input image to obtain a cropped region of interest, and then scaling the cropped region of interest to the predefined size to obtain the first output image (or, in some examples, scaling the cropped region of interest to a size greater than the predefined size and then applying a final crop to arrive at the first output image). If the scale-then-crop order is selected, the first input image is scaled prior to any cropping such that the region of interest of the first input image is scaled to the predefined size, after which the scaled region of interest is cropped from the scaled first input image to obtain the first output image.

The image processing system 224 then processes the first input image according to the determined crop-and-scale order to generate a first output image (block 710). The first output image is fed to the object tracking system (block 712) and, at block 714, the object tracking system utilizes the first output image to perform object tracking. For example, in the case of tracking the full body of a human (see the examples in FIG. 5 and FIG. 6), the object tracking system may implement a human motion tracking model, e.g., a neural network trained for visual human body tracking. The human motion tracking model may generate predictions that can be used by the image processing system 224 in the processing of subsequent frames.

Turning now to FIG. 8, the method described with reference to FIG. 7 then proceeds to block 802, where the image processing system 224 accesses a second input image captured by the device's camera subsequent to the capturing of the first input image. The second input image also depicts the object being tracked, but it will be appreciated that the object may be moving relative to the device and thus be in a different position when compared to the first input image. In some examples, the first input image immediately precedes the second input image in the sequence of frames.

A region of interest of the second input image is determined at block 804, and at block 806, the image processing system 224 automatically adjusts the crop-and-scale order of the image processing operation for the second input image such that the crop-and-scale order for the second input image is different from the crop-and-scale order for the first input image. As mentioned, the operations at blocks 804 and block 806 may be carried out by analyzing one or more of the aforementioned object tracking parameters to determine a suitable region of interest and crop-and-scale order for the second input image. It should be appreciated that a display overlapping region may also be dynamically updated as this region may change as a result of factors such as changes in the distance between the object and the camera, as well as changes in extrinsic or intrinsic parameters.

For example, in a case where a walking human is being tracked by the object tracking system 226, the image processing system 224 may obtain a plurality of data points, e.g., IMU and SLAM data, per frame, allowing for relatively accurate prediction of human motion from one frame to the next (a SLAM system may, for example, provide feedback 30 times per second). Based on the pose data from the 6DOF tracker 222 and the human motion prediction, the image processing system 224 can estimate the region of interest (e.g., a rectangular box inside of the display overlapping region) to direct the cropping and scaling operations at, as well as the appropriate order of these operations. These parameters are merely examples, and the object tracking parameters may include one or more of: object tracking status data; an object motion prediction; an object position relative to the region of interest; an AR device motion prediction; an AR device frame bending estimation; one or more camera-display transformation values; a margin padding value; intrinsic parameters of a camera and/or display; or extrinsic parameters of a camera and/or display.

The method then proceeds to block 808, where a second output image is generated from the second input image. This generation operation includes performing the image processing operation according to the adjusted crop-and-scale order for the second input image. The second output image is fed to the object tracking system (block 810) and, at block 812, the object tracking system utilizes the second output image to proceed further with its object tracking task. Subsequent frames may be analyzed in a similar fashion and the image processing system 224 may adaptively switch between cropping and scaling orders during the user session. The method concludes at closing loop block 814.

Figure 9:
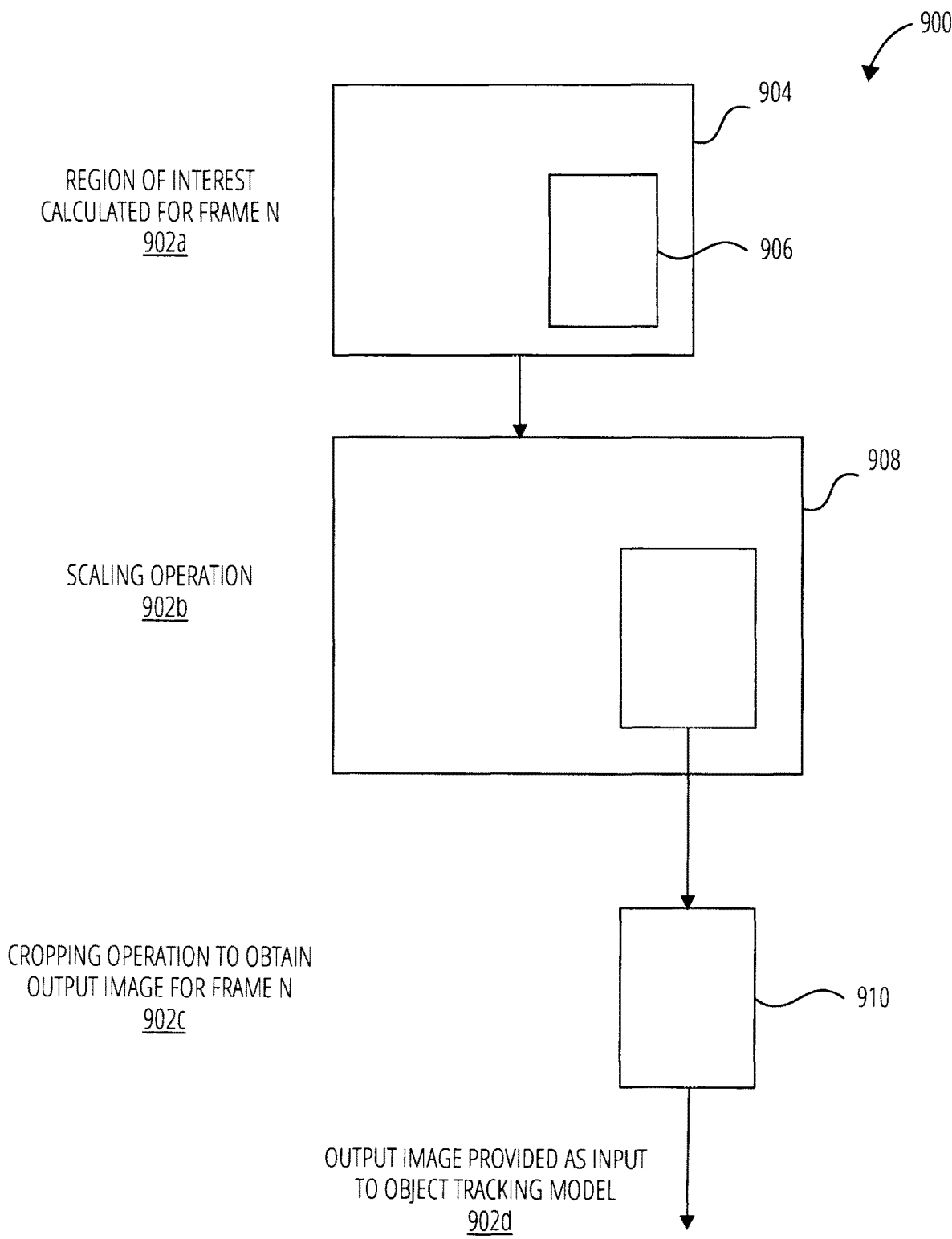
FIG. 9 is a diagrammatic illustration of aspects of an image processing operation according to some examples.

FIG. 9 is a diagrammatic illustration 900 of aspects of an image processing operation, wherein the image processing operation has a scale-then-crop order for a particular frame (frame N) and an output image related to the particular frame is provided as input to an object tracking system, according to some examples.

At stage 902a, a region of interest 906 is calculated for frame N 904. The region of interest can be determined based on one or more parameters, such as an object tracking prediction based on the $(N-1)^{th}$ frame, AR device motion data, bending estimation, camera-display transformation values, and/or user-defined values such as a padding margin value (e.g., an instruction to add a margin area of 20%).

Referring to camera-display transformation, it is noted that changing the transformation between a camera and a display (e.g., changing rotational position), may also change the display overlapping region. A change is the display overlapping region may in turn result in a change in the region of interest. Accordingly, camera-display transformation values may be tracked and utilized in determining the region of interest.

It should be noted that, prior to stage 902a, e.g., upon commencement of an object detection or object tracking process, a general cropping area may be initialized. For example, the general cropping area may be initialized, for frame number 1 (not shown), at the center of the frame itself or at the center of an AR device display, using a suitable camera-to-display transformation. This general cropping area may then be adjusted for each frame to define the region of interest for the particular frame.

In FIG. 9, the scale-then-crop order is to be used for image processing is determined by the crop-and-scale order module 308. At stage 902b, a scaling operation is performed to generate a scaled version 908 of frame N. Subsequently, at stage 902c, the scaled region of interest 910 is cropped from the scaled version 908. In this way, an output image is obtained for frame N, and this output image is provided as input to an object tracking model at stage 902d.

Figure 10:
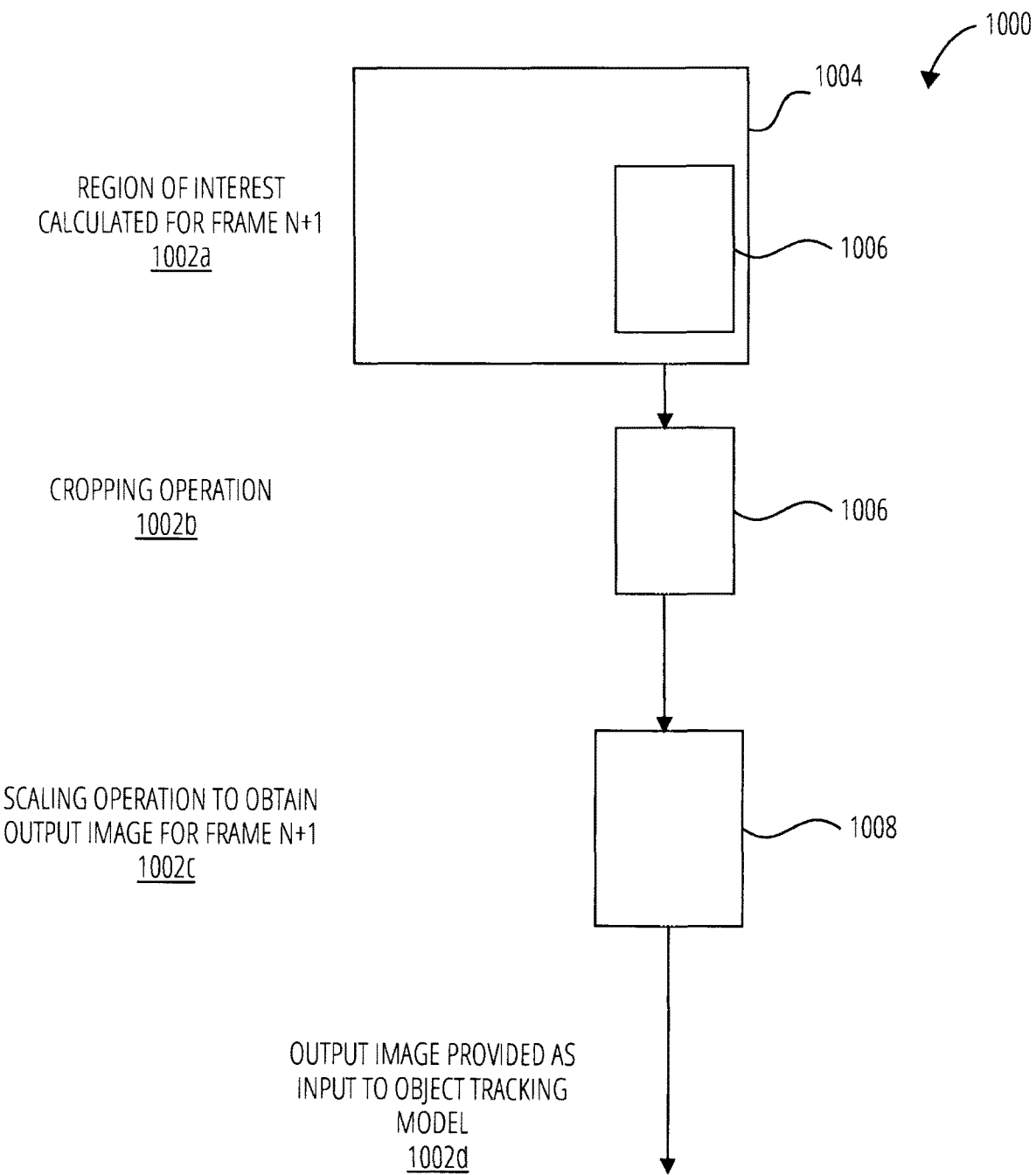
FIG. 10 is a diagrammatic illustration of aspects of an image processing operation according to some examples.

FIG. 10 is a diagrammatic illustration 1000 of aspects of an image processing operation, wherein the image processing operation has a crop-then-scale order for a particular frame (frame N+1) and an output image related to the particular frame is again provided as input to the object tracking system, according to some examples.

At stage 1002a, a region of interest 1006 is calculated for frame N+1 (1004). The region of interest can be determined based on one or more parameters, such as an object tracking prediction based on the $N^{th}$ frame (and/or earlier frames), AR device motion data, bending estimation, camera-display transformation values, and/or user-defined values such as a padding margin value. In some examples, the tracking data determined by the model for the $N^{th}$ frame is fed back for use in processing of frame N+1.

As can be seen in FIG. 10, the crop-and-scale order module 308 determines that the crop-then-scale order is to be used for image processing. At stage 1002b, a cropping operation is performed to generate a cropped version of frame N+1 comprising the region of interest 1006. Subsequently, at stage 1002c, the region 1006 is scaled to obtain the output image 1008 for frame N+1. This output image is provided as further input to the object tracking model at stage 1002d. As discussed elsewhere, in some examples, the object tracking model requires input in a fixed image size and the output images are thus cropped and scaled so as to match this requirement.

Figure 11:
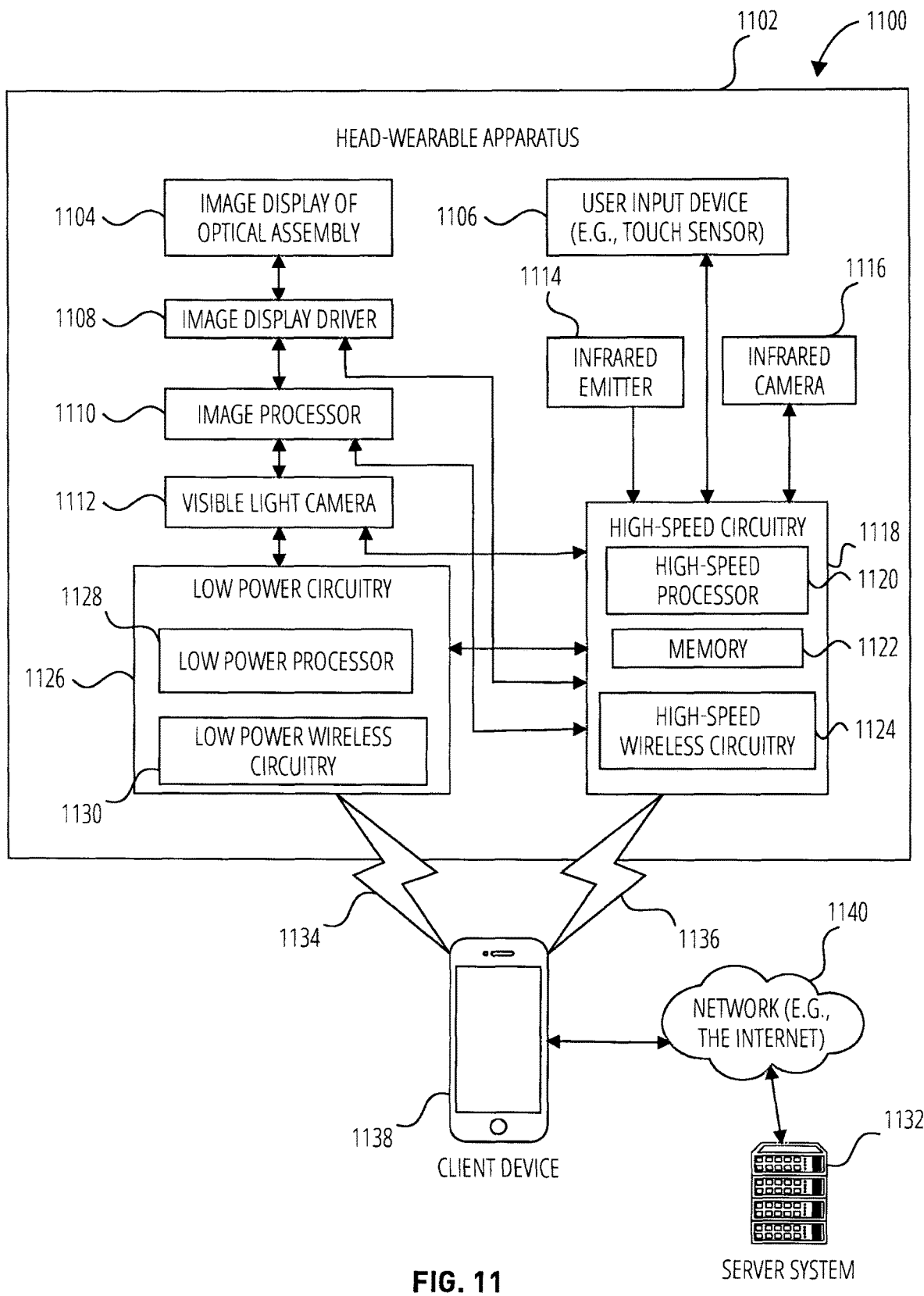
FIG. 11 illustrates a network environment in which a head-wearable apparatus can be implemented according to some examples.

FIG. 11 illustrates a network environment 1100 in which a head-wearable apparatus 1102 can be implemented according to some examples. FIG. 11 provides a high-level functional block diagram of an example head-wearable apparatus 1102 communicatively coupled a mobile client device 1138 and a server system 1132 via a suitable network 1140. Adaptive image processing techniques described herein may be performed using the head-wearable apparatus 1102 or a network of devices similar to those shown in FIG. 11.

The head-wearable apparatus 1102 includes a camera, such as at least one of a visible light camera 1112, an infrared emitter 1114 and an infrared camera 1116. The client device 1138 can be capable of connecting with head-wearable apparatus 1102 using both a communication link 1134 and a communication link 1136. The client device 1138 is connected to the server system 1132 via the network 1140. The network 1140 may include any combination of wired and wireless connections.

The head-wearable apparatus 1102 includes two displays of image display of optical assembly 1104. The two displays include one associated with the left lateral side and one associated with the right lateral side of the head-wearable apparatus 1102. The head-wearable apparatus 1102 also includes an image display driver 1108, an image processor 1110, low-power low power circuitry 1126, and high-speed circuitry 1118. The two displays of the image display of optical assembly 1104 are for presenting images and videos, including an image that can provide a graphical user interface to a user of the head-wearable apparatus 1102.

The image display driver 1108 commands and controls the image display of the image display of optical assembly 1104. The image display driver 1108 may deliver image data directly to each image display of the image display of optical assembly 1104 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

Figure 12:
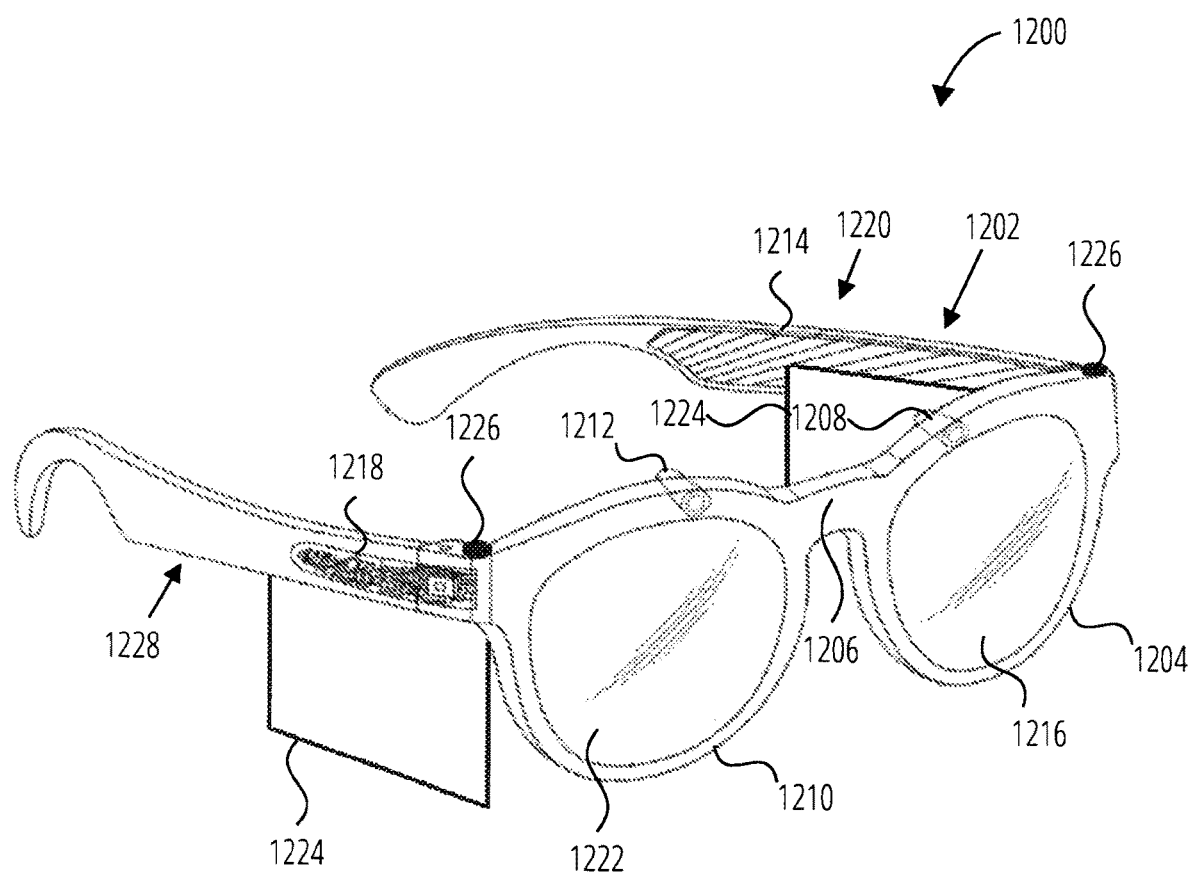
FIG. 12 is a perspective view of a head-worn device, according to some examples.
Figure 13:
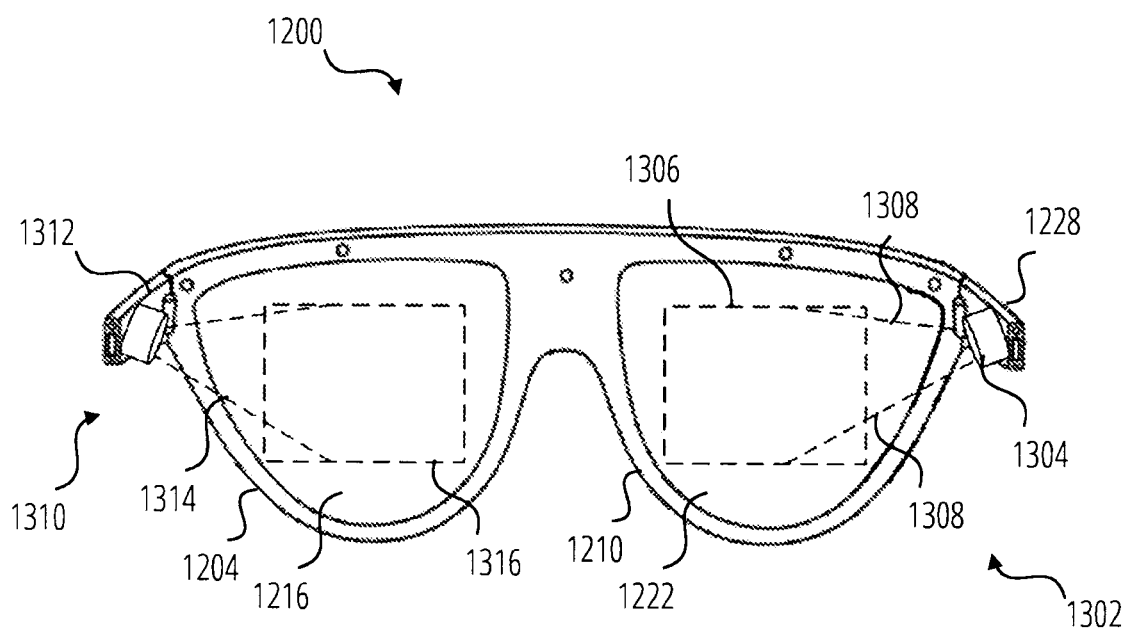
FIG. 13 illustrates a further view of the head-worn device of FIG. 12, showing the device from the perspective of a user, according to some examples.

The head-wearable apparatus 1102 may include a frame and stems (or temples) extending from a lateral side of the frame (see FIG. 12 and FIG. 13 which show an apparatus according to some examples). The head-wearable apparatus 1102 of FIG. 11 further includes a user input device 1106 (e.g., touch sensor or push button) including an input surface on the head-wearable apparatus 1102. The user input device 1106 is configured to receive, from the user, an input selection to manipulate the graphical user interface of the presented image.

The components shown in FIG. 11 for the head-wearable apparatus 1102 are located on one or more circuit boards, for example a printed circuit board (PCB) or flexible PCB, in the rims or temples. Alternatively, or additionally, the depicted components can be located in the chunks, frames, hinges, or bridge of the head-wearable apparatus 1102. Left and right sides of the head-wearable apparatus 1102 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. The memory 1122 can also include a storage device. As further shown in FIG. 11, the high-speed circuitry 1118 includes a high-speed processor 1120, the memory 1122, and high-speed wireless circuitry 1124. In FIG. 11, the image display driver 1108 is coupled to the high-speed circuitry 1118 and operated by the high-speed processor 1120 in order to drive the left and right image displays of the image display of optical assembly 1104. The high-speed processor 1120 may be any processor capable of managing high-speed communications and operation of any general computing system needed for the head-wearable apparatus 1102. The high-speed processor 1120 includes processing resources needed for managing high-speed data transfers over the communication link 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 1102.11 communication standards, also referred to herein as Wi-Fi. In other examples, other high-speed communications standards may be implemented by high-speed wireless circuitry 1124.

The low power wireless circuitry 1130 and the high-speed wireless circuitry 1124 of the head-wearable apparatus 1102 can include short range transceivers (Bluetooth™) and wireless wide, local, or wide area network transceivers (e.g., cellular or Wi-Fi). The client device 1138, including the transceivers communicating via the communication link 1134 and communication link 1136, may be implemented using details of the architecture of the head-wearable apparatus 1102, as can other elements of the network 1140.

The memory 1122 includes any storage device capable of storing various data and applications, including, among other things, camera data generated by the visible light camera 1112, infrared camera 1116, and the image processor 1110, as well as images generated for display by the image display driver 1108 on the image displays of the image display of optical assembly 1104. While the memory 1122 is shown as integrated with the high-speed circuitry 1118, in other examples, the memory 1122 may be an independent standalone element of the head-wearable apparatus 1102. In certain such examples, electrical routing lines may provide a connection through a chip that includes the high-speed processor 1120 from the image processor 1110 or low power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low power processor 1128 or high-speed processor 1120 of the head-wearable apparatus 1102 can be coupled to the camera (visible light camera 1112, infrared emitter 1114, or infrared camera 1116), the image display driver 1108, the user input device 1106 (e.g., touch sensor or push button), and the memory 1122.

In some examples, and as shown in FIG. 11, the head-wearable apparatus 1102 is connected with a host computer. For example, the head-wearable apparatus 1102 is paired with the client device 1138 via the communication link 1136 or connected to the server system 1132 via the network 1140. The server system 1132 may be one or more computing devices as part of a service or network computing system, for example, that include a processor, a memory, and network communication interface to communicate over the network 1140 with the client device 1138 and head-wearable apparatus 1102.

The client device 1138 includes a processor and a network communication interface coupled to the processor. The network communication interface allows for communication over the network 1140, communication link 1134 or communication link 1136. The client device 1138 can further store at least portions of the instructions for generating a binaural audio content in the client device 1138's memory to implement the functionality described herein.

Output components of the head-wearable apparatus 1102 include visual components, such as a display (e.g., a liquid crystal display (LCD)), a plasma display panel (PDP), a light emitting diode (LED) display, a projector, or a waveguide. The image displays of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the client device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with the head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1136 from the client device 1138 via the low power wireless circuitry 1130 or high-speed wireless circuitry 1124.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

FIG. 12 is a perspective view of a head-worn AR device in the form of glasses 1200, in accordance with some examples. The glasses 1200 can include a frame 1202 made from any suitable material such as plastic or metal, including any suitable shape memory alloy. In one or more examples, the frame 1202 includes a first or left optical element holder 1204 (e.g., a display or lens holder) and a second or right optical element holder 1210 connected by a bridge 1206. A first or left optical element 1216 and a second or right optical element 1222 can be provided within respective left optical element holder 1204 and right optical element holder 1210.

The right optical element 1222 and the left optical element 1216 can be a lens, a display, a display assembly, or a combination of the foregoing. Any suitable display assembly can be provided in the glasses 1200.

The frame 1202 additionally includes a left arm or temple piece 1220 and a right arm or temple piece 1228. In some examples, the frame 1202 can be formed from a single piece of material so as to have a unitary or integral construction.

The glasses 1200 can include a computing device, such as a computer 1218, which can be of any suitable type so as to be carried by the frame 1202 and, in some examples, of a suitable size and shape, so as to be partially disposed in one of the temple piece 1220 or the temple piece 1228. The computer 1218 can include one or more processors with memory, wireless communication circuitry, and a power source. As discussed with reference to FIG. 11 above, the computer 1218 may comprise low-power circuitry, high-speed circuitry, and a display processor. Various other examples may include these elements in different configurations or integrated together in different ways. Additional details of aspects of the computer 1218 may be implemented as illustrated by the head-wearable apparatus 1102 discussed above.

The computer 1218 additionally includes a battery 1214 or other suitable portable power supply. In some examples, the battery 1214 is disposed in left temple piece 1220 and is electrically coupled to the computer 1218 disposed in the right temple piece 1228. The glasses 1200 can include a connector or port (not shown) suitable for charging the battery 1214 a wireless receiver, transmitter or transceiver (not shown), or a combination of such devices.

The glasses 1200 include a first or left camera 1208 and a second or right camera 1212. Although two cameras are depicted, other examples contemplate the use of a single or additional (i.e., more than two) cameras. In some examples, the glasses 1200 include any number of input sensors or other input/output devices in addition to the left camera 1208 and the right camera 1212. Such sensors or input/output devices can additionally include biometric sensors, location sensors, motion sensors, and so forth. In some examples, the left camera 1208 and the right camera 1212 provide video frame data for use by the glasses 1200 to extract 3D information from a real-world scene, to track objects, to determine relative positions between objects, etc.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The glasses 1200 may also include a touchpad 1224 mounted to or integrated with one or both of the left temple piece 1220 and right temple piece 1228. The touchpad 1224 is generally vertically-arranged, approximately parallel to a user's temple in some examples. As used herein, generally vertically aligned means that the touchpad is more vertical than horizontal, although potentially more vertical than that. Additional user input may be provided by one or more buttons 1226, which in the illustrated examples are provided on the outer upper edges of the left optical element holder 1204 and right optical element holder 1210. The one or more touchpads 1224 and buttons 1226 provide a means whereby the glasses 1200 can receive input from a user of the glasses 1200.

FIG. 13 illustrates the glasses 1200 from the perspective of a user. For clarity, a number of the elements shown in FIG. 12 have been omitted. As described in FIG. 12, the glasses 1200 shown in FIG. 13 include left optical element 1216 and right optical element 1222 secured within the left optical element holder 1204 and the right optical element holder 1210 respectively.

The glasses 1200 include forward optical assembly 1302 comprising a right projector 1304 and a right near eye display 1306, and a forward optical assembly 1310 including a left projector 1312 and a left near eye display 1316.

In some examples, the near eye displays are waveguides. The waveguides include reflective or diffractive structures (e.g., gratings and/or optical elements such as mirrors, lenses, or prisms). Light 1308 emitted by the projector 1304 encounters the diffractive structures of the waveguide of the near eye display 1306, which directs the light towards the right eye of a user to provide an image on or in the right optical element 1222 that overlays the view of the real world seen by the user. Similarly, light 1314 emitted by the projector 1312 encounters the diffractive structures of the waveguide of the near eye display 1316, which directs the light towards the left eye of a user to provide an image on or in the left optical element 1216 that overlays the view of the real world seen by the user. The combination of a GPU, the forward optical assembly 1302, the forward optical assembly 1310, the left optical element 1216, and the right optical element 1222 may provide an optical engine of the glasses 1200. The glasses 1200 use the optical engine to generate an overlay of the real-world view of the user including display of a 3D user interface to the user of the glasses 1200.

It will be appreciated however that other display technologies or configurations may be utilized within an optical engine to display an image to a user in the user's field of view. For example, instead of a projector 1304 and a waveguide, an LCD, LED or other display panel or surface may be provided.

In use, a user of the glasses 1200 will be presented with information, content and various 3D user interfaces on the near eye displays. As described in more detail elsewhere herein, the user can then interact with a device such as the glasses 1200 using a touchpad 1224 and/or the buttons 1226, voice inputs or touch inputs on an associated device (e.g., the client device 1138 shown in FIG. 11), and/or hand movements, locations, and positions detected by the glasses 1200.

Figure 14:
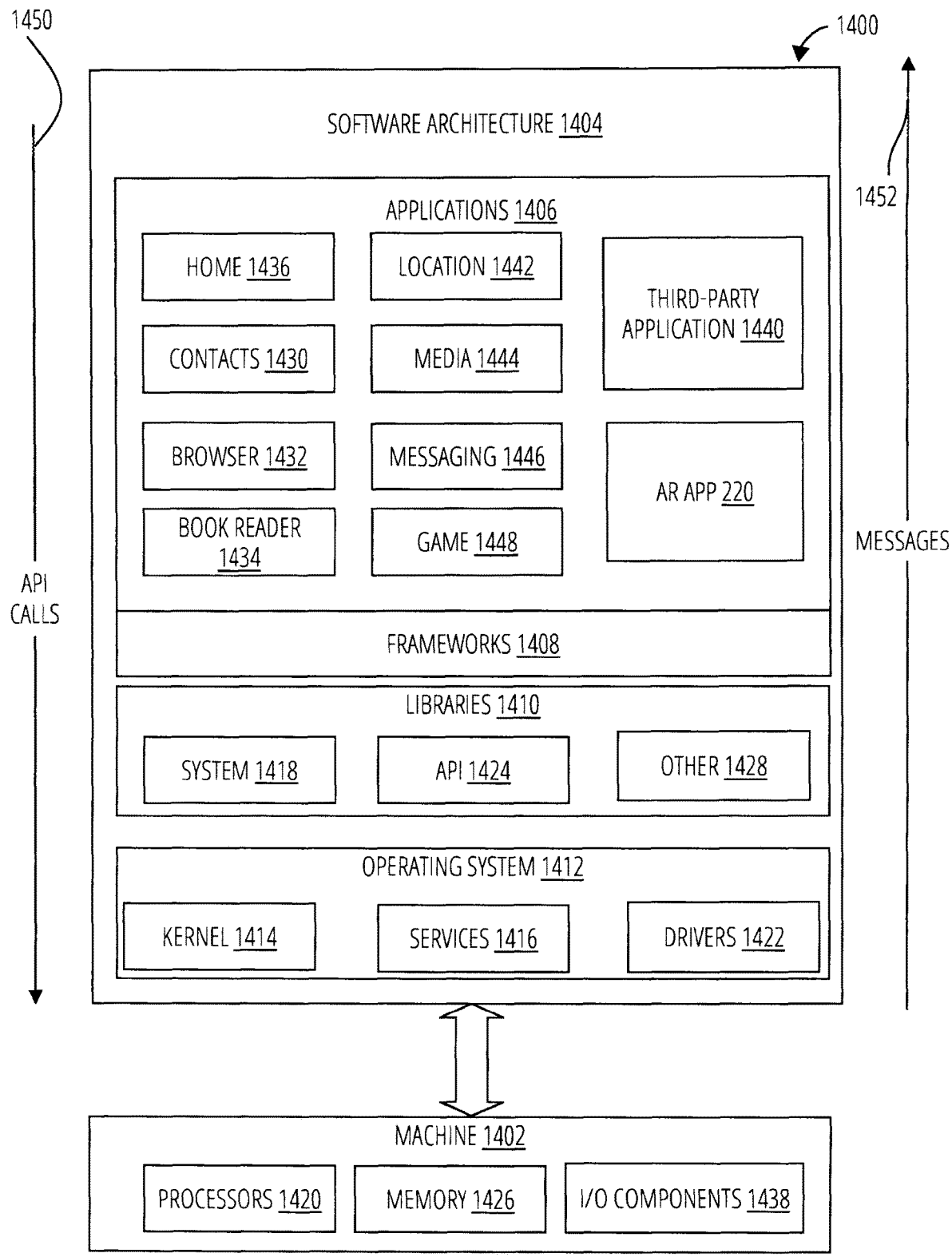
FIG. 14 is block diagram showing a software architecture within which the present disclosure may be implemented, according to some examples.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1410 provide a low-level common infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a high-level common infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In some examples, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In some examples, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 14, the third-party application 1440 can invoke the API calls 1450 provided by the operating system 1412 to facilitate functionality described herein. The applications

1406 may include an AR application such as the AR application 220 described herein, according to some examples.

Figure 15:
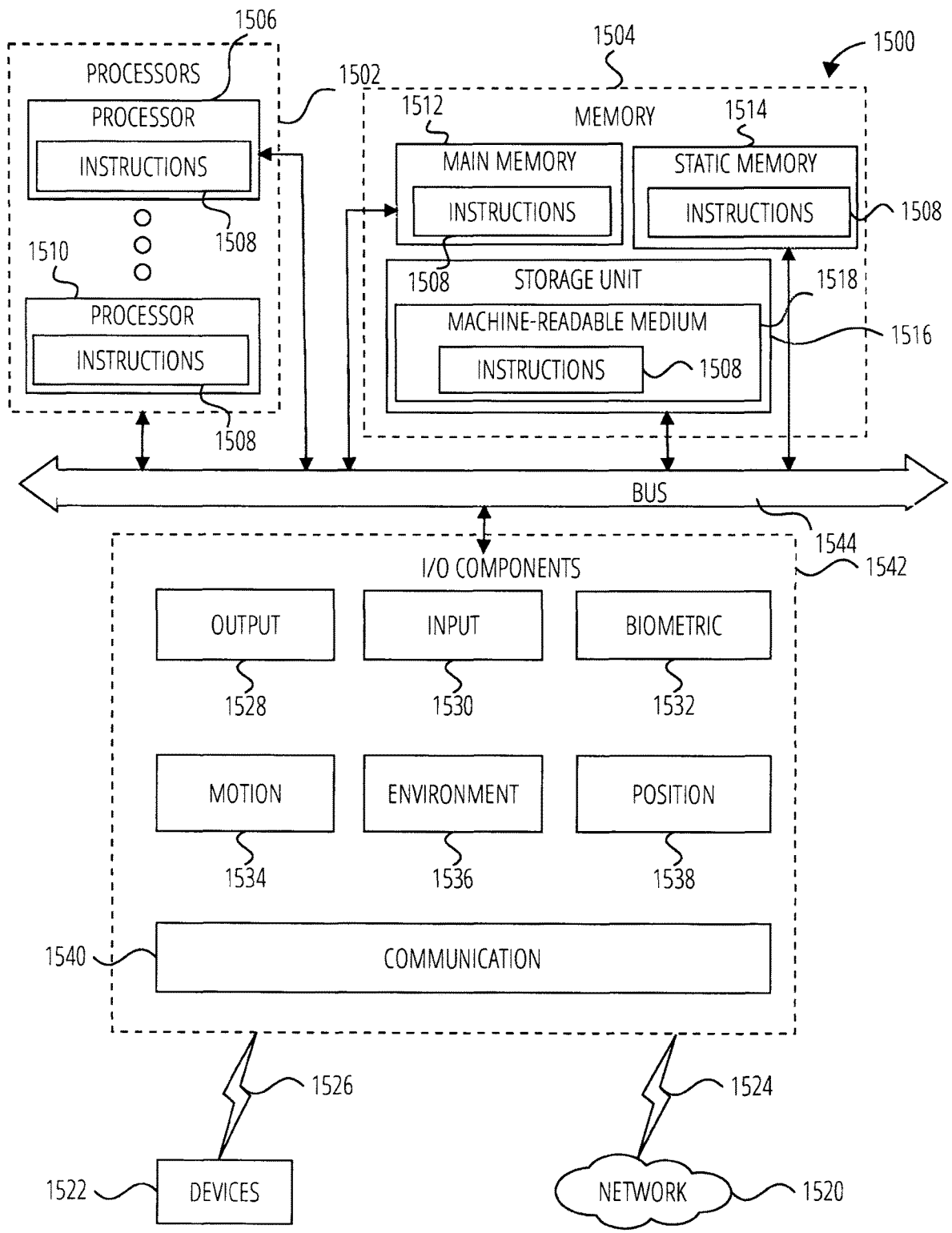
FIG. 15 is a diagrammatic representation of a machine in the form of a computer system within which a set of instructions may be executed for causing the machine to perform any one or more of the methodologies discussed herein, according to some examples.

FIG. 15 is a diagrammatic representation of a machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), AR device, VR device, a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include Processors 1502, memory 1504, and I/O components 1542, which may be configured to communicate with each other via a bus 1544. In some examples, the processors 1502 (e.g., a Central Processing Unit (CPU), a Reduced Instruction Set Computing (RISC) processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors, or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various examples, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor Components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth™ components, Wi-Fi™ components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed examples.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Examples of the present disclosure may be useful in various applications, such as target tracking and on-target augmentations in AR devices, e.g., AR glasses.

Where a target tracking or detection model utilizes input images of a fixed size (e.g., for input to neural networks), AR glasses may produce captured images with more information than is relevant for the model. The captured images may be wide-angle images and only a small portion of the images may include the target. The displays of the AR glasses may each have a much smaller field of view than an associated camera capturing the images, resulting in objects outside of the ultimate field of view being picked up in the captured images, and the model may require, as input, an image having dimensions different from those of the captured images.

Fixed cropping and scaling operations may be undesirable, e.g., certain fixed operations may be overly computationally intensive, and switching may be desirable to account for aspects such as object position within a region of interest and the distance between the object and the camera. Examples described herein provide for adaptive image processing, including dynamic switching of cropping and scaling orders, to obtain useful or accurate inputs for such tracking or detection models. A technical problem of improving the computational efficiency of image processing, while still allowing for accurate tracking or detection without excessive data or accuracy loss, can therefore be addressed by examples described herein.

Examples described herein enable several objectives involved in obtaining or determining an "optimal" or "near-optimal" region, as described above, to be better balanced, or allow for an effective compromise between competing objectives.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example.

EXAMPLES

Described implementations of the subject matter can include one or more features, alone or in combination as illustrated below by way of example.

Example 1 is a method comprising: accessing a first input image captured by a camera of an augmented reality (AR) device; determining a region of interest of the first input image, wherein the region of interest of the first input image includes an object that is being tracked using an object tracking system; determining, for the first input image and based on one or more object tracking parameters, a crop-and-scale order of an image processing operation directed at the region of interest of the first input image, the crop-and-scale order being dynamically adjustable between a first order and a second order; generating, via performing the image processing operation, a first output image from the first input image; and accessing, by the object tracking system, the first output image to track the object.

Example 2 includes the method of example 1, wherein the one or more object tracking parameters comprise object tracking data for a previous input image captured by the camera of the AR device, the crop-and-scale order for the first input image being automatically determined based at least in part on the object tracking data for the previous input image.

Example 3 includes the method of any of examples 1-2, further comprising: capturing, by the camera of the AR device, a plurality of images defining a sequence of frames, the sequence of frames including the first input image and the previous input image, and the previous input image immediately preceding the first input image in the sequence of frames.

Example 4 includes the method of any of examples 1-3, wherein the first output image is defined by a cropped and scaled image obtained from within the first input image using the image processing operation, the cropped and scaled image having a predefined size, and the first input image having a first size that differs from the predefined size.

Example 5 includes the method of any of examples 1-4, wherein the object tracking system uses a sequence of cropped and scaled images of the predefined size to track the object.

Example 6 includes the method of any of examples 1-5, wherein the determining the region of interest of the first input image comprises calculating a display overlapping region of the first input image, the display overlapping region being a region of overlap between the first input image and a display area defined by a display of the AR device.

Example 7 includes the method of any of example 1-6, wherein the determining the region of interest of the first input image further comprises determining the region of interest within the display overlapping region based at least partially on the one or more object tracking parameters.

Example 8 includes the method of any of examples 1-7, wherein the first order is a crop-then-scale order in which cropping is automatically performed prior to scaling to obtain an output image of a predefined size, and wherein the second order is a scale-then-crop order in which scaling is automatically performed prior to cropping to obtain an output image of the predefined size.

Example 9 includes the method of any of examples 1-8, wherein, for the first input image, the crop-then-scale order comprises cropping the region of interest from the first input image to obtain a cropped region of interest, and then scaling the cropped region of interest to the predefined size to obtain the first output image.

Example 10 includes the method of any of examples 1-9, wherein, for the first input image, the scale-then-crop order comprises scaling the first input image such that the region of interest of the first input image is scaled to the predefined size, and then cropping the scaled region of interest from the scaled first input image to obtain the first output image.

Example 11 includes the method of any of examples 1-10, wherein the first order is stored as a default order for the image processing operation in a storage component associated with the AR device, the crop-and-scale order being dynamically and automatically adjustable to the second order based on the one or more object tracking parameters.

Example 12 includes the method of any of examples 1-11, wherein the one or more object tracking parameters comprise at least one of: object tracking status data; an object motion prediction; an object position relative to the region of interest; an AR device motion prediction; an AR device frame bending estimation; one or more camera-display transformation values; or a margin padding value.

Example 13 includes the method of any of examples 1-12, further comprising: accessing a second input image captured by the camera of the AR device, the second input image depicting the object and having been captured subsequent to the capturing of the first input image; determining a region of interest of the second input image; automatically adjusting, for the second input image and based on the one or more object tracking parameters, the crop-and-scale order of the image processing operation such that the crop-and-scale order for the second input image is different from the crop-and-scale order for the first input image; generating, via performing the image processing operation according to the crop-and-scale order for the second input image, a second output image from the second input image; and accessing, by the object tracking system, the second output image to track the object.

Example 14 includes the method of any of examples 1-13, further comprising capturing, by the camera of the AR device, a plurality of images defining a sequence of frames, the frames including the first input image and the second input image, and the first input image immediately preceding the second input image in the sequence of frames.

Example 15 includes the method of any of examples 1-14, wherein the adjusting the crop-and-scale order for the second input image comprises automatically adjusting the crop-and-scale order based on values for the one or more object tracking parameters as determined for the first input image.

Example 16 includes the method of any of examples 1-15, wherein the object tracking system comprises an object tracking machine learning model that tracks the object in a three-dimensional space.

Example 17 includes the method of any of examples 1-16, wherein the AR device is a head-wearable apparatus.

Example 18 includes the method of any of examples 1-17, wherein the AR device comprises wearable computing glasses.

Example 19 is a computing apparatus comprising: a processor; and a memory storing instructions that, when executed by the processor, configure the apparatus to perform operations comprising: accessing a first input image captured by a camera of an augmented reality (AR) device; determining a region of interest of the first input image, wherein the region of interest of the first input image includes an object that is being tracked using an object tracking system; determining, for the first input image and based on one or more object tracking parameters, a crop-and-scale order of an image processing operation directed at the region of interest of the first input image, the crop-and-scale order being dynamically adjustable between a first order and a second order; generating, via performing the image processing operation, a first output image from the first input image; and accessing, by the object tracking system, the first output image to track the object.

Example 20 is a non-transitory computer-readable storage medium, the computer-readable storage medium including instructions that when executed by a computer, cause the computer to perform operations comprising: accessing a first input image captured by a camera of an augmented reality (AR) device; determining a region of interest of the first input image, wherein the region of interest of the first input image includes an object that is being tracked using an object tracking system; determining, for the first input image and based on one or more object tracking parameters, a crop-and-scale order of an image processing operation directed at the region of interest of the first input image, the crop-and-scale order being dynamically adjustable between a first order and a second order; generating, via performing the image processing operation, a first output image from the first input image; and accessing, by the object tracking system, the first output image to track the object.

Example 21 is a computing apparatus configured to perform the method of any of examples 1-18.

Example 22 is a non-transitory computer-readable storage medium including instructions for performing the method of any of examples 1-18.

What is claimed is:

1. A method comprising:

accessing a first input image captured using at least one camera of an augmented reality (AR) device;

determining a region of interest of the first input image, the region of interest of the first input image including an object that is being tracked using an object tracking system;

determining, for the first input image and based on one or more object tracking parameters, a crop-and-scale order of an image processing operation directed at the region of interest of the first input image, the crop-and-scale order being dynamically adjustable between a first order and a second order, and the one or more object tracking parameters comprising at least one of object tracking status data, an object motion prediction, an object position relative to the region of interest, an AR device motion prediction, an AR device frame bending estimation, one or more camera-display transformation values, or a margin padding value;

generating, via performing of the image processing operation, a first output image from the first input image;

accessing a second input image captured using the at least one camera, the second input image depicting the object and captured subsequent to capturing of the first input image;

automatically adjusting, for the second input image and based on the one or more object tracking parameters, the crop-and-scale order of the image processing operation such that the crop-and-scale order for the second input image differs from the crop-and-scale order for the first input image;

generating, via performing of the image processing operation according to the crop-and-scale order for the second input image, a second output image from the second input image; and accessing, by the object tracking system, the first output image and the second output image to track the object.

2. The method of claim 1, wherein the one or more object tracking parameters comprise object tracking data for a previous input image captured prior to the first input image using the at least one camera of the AR device, the crop-and-scale order for the first input image being automatically determined based at least in part on the object tracking data for the previous input image.

3. The method of claim 2, further comprising:
capturing, using the at least one camera of the AR device, a plurality of images defining a sequence of frames, the sequence of frames including the first input image, the second input image, and the previous input image, and the previous input image immediately preceding the first input image in the sequence of frames.

4. The method of claim 1, wherein the first output image is defined by a cropped and scaled image obtained from within the first input image using the image processing operation, the cropped and scaled image having a predefined size, and the first input image having a first size that differs from the predefined size.

5. The method of claim 4, wherein the object tracking system uses a sequence of cropped and scaled images of the predefined size to track the object.

6. The method of claim 1, wherein the determining the region of interest of the first input image comprises calculating a display overlapping region of the first input image, the display overlapping region being a region of overlap between the first input image and a display area defined by a display of the AR device.

7. The method of claim 6, wherein the determining the region of interest of the first input image further comprises determining the region of interest within the display overlapping region based at least partially on the one or more object tracking parameters.

8. The method of claim 1, wherein the first order is a crop-then-scale order in which cropping is automatically performed prior to scaling to obtain an output image of a predefined size, and wherein the second order is a scale-then-crop order in which scaling is automatically performed prior to cropping to obtain an output image of the predefined size.

9. The method of claim 8, wherein, for the first input image, the crop-then-scale order comprises cropping the region of interest from the first input image to obtain a cropped region of interest, and then scaling the cropped region of interest to the predefined size to obtain the first output image.

10. The method of claim 8, wherein, for the first input image, the scale-then-crop order comprises scaling the first input image such that the region of interest of the first input image is scaled to the predefined size, and then cropping the scaled region of interest from the scaled first input image to obtain the first output image.

11. The method of claim 8, wherein the first order is stored as a default order for the image processing operation in a storage component associated with the AR device, the crop-and-scale order being dynamically and automatically adjustable to the second order based on the one or more object tracking parameters.

12. The method of claim 1, further comprising:
determining a region of interest of the second input image.

13. The method of claim 1, further comprising:
capturing, using the at least one camera of the AR device, a plurality of images defining a sequence of frames, the frames including the first input image and the second input image, and the first input image immediately preceding the second input image in the sequence of frames.

14. The method of claim 1, wherein the adjusting the crop-and-scale order for the second input image comprises automatically adjusting the crop-and-scale order based on values for the one or more object tracking parameters as determined for the first input image.

15. The method of claim 1, wherein the object tracking system comprises an object tracking machine learning model that tracks the object in a three-dimensional space.

16. The method of claim 1, wherein the AR device is a head-wearable apparatus.

17. The method of claim 16, wherein the AR device comprises wearable computing glasses.

18. A computing apparatus comprising:
at least one processor; and
memory storing instructions that, when executed by the processor, configure the apparatus to perform operations comprising:
accessing a first input image captured using at least one camera of an augmented reality (AR) device;
determining a region of interest of the first input image, the region of interest of the first input image including an object that is being tracked using an object tracking system;
determining, for the first input image and based on one or more object tracking parameters, a crop-and-scale order of an image processing operation directed at the region of interest of the first input image, the crop-and-scale order being dynamically adjustable between a first order and a second order, and the one or more object tracking parameters comprising at least one of object tracking status data, an object motion prediction, an object position relative to the region of interest, an AR device motion prediction, an AR device frame bending estimation, one or more camera-display transformation values, or a margin padding value;
generating, via performing of the image processing operation, a first output image from the first input image;
accessing a second input image captured using the at least one camera, the second input image depicting the object and captured subsequent to capturing of the first input image;
automatically adjusting, for the second input image and based on the one or more object tracking parameters, the crop-and-scale order of the image processing operation such that the crop-and-scale order for the second input image differs from the crop-and-scale order for the first input image;

generating, via performing of the image processing operation according to the crop-and-scale order for the second input image, a second output image from the second input image; and accessing, by the object tracking system, the first output image and the second output image to track the object.

19. A non-transitory computer-readable storage medium, the computer-readable storage medium including instructions that when executed by a computer, cause the computer to perform operations comprising:

accessing a first input image captured using at least one camera of an augmented reality (AR) device;

determining a region of interest of the first input image, the region of interest of the first input image including an object that is being tracked using an object tracking system;

determining, for the first input image and based on one or more object tracking parameters, a crop-and-scale order of an image processing operation directed at the region of interest of the first input image, the crop-and-scale order being dynamically adjustable between a first order and a second order, and the one or more object tracking parameters comprising at least one of object tracking status data, an object motion prediction, an object position relative to the region of interest, an AR device motion prediction, an AR device frame bending estimation, one or more camera-display transformation values, or a margin padding value;

generating, via performing of the image processing operation, a first output image from the first input image;

accessing a second input image captured using the at least one camera, the second input image depicting the object and captured subsequent to capturing of the first input image;

automatically adjusting, for the second input image and based on the one or more object tracking parameters, the crop-and-scale order of the image processing operation such that the crop-and-scale order for the second input image differs from the crop-and-scale order for the first input image;

generating, via performing of the image processing operation according to the crop-and-scale order for the second input image, a second output image from the second input image; and accessing, by the object tracking system, the first output image and the second output image to track the object.

20. The non-transitory computer-readable storage medium of claim 19, wherein the adjusting the crop-and-scale order for the second input image comprises automatically adjusting the crop-and-scale order based on values for the one or more object tracking parameters as determined for the first input image.

* * * * *